United States Patent
Lamburt et al.

(10) Patent No.: US 11,086,888 B2
(45) Date of Patent: Aug. 10, 2021

(54) METHOD AND SYSTEM FOR GENERATING DIGITAL CONTENT RECOMMENDATION

(71) Applicant: YANDEX EUROPE AG, Lucerne (CH)

(72) Inventors: Viktor Grigorievich Lamburt, Moscow (RU); Dmitry Valerievich Ushanov, Moscow (RU); Sergey Dmitrievich Ivanychev, Nizhny Novgorod (RU)

(73) Assignee: YANDEX EUROPE AG, Lucerne (CH)

( * ) Notice: Subject to any disclaimer, the term of this patent is extended or adjusted under 35 U.S.C. 154(b) by 204 days.

(21) Appl. No.: 16/503,560

(22) Filed: Jul. 4, 2019

(65) Prior Publication Data
US 2020/0110754 A1   Apr. 9, 2020

(30) Foreign Application Priority Data
Oct. 9, 2018 (RU) .......................... RU2018135455

(51) Int. Cl.
*G06F 16/2457*   (2019.01)
*G06F 16/435*   (2019.01)
*G06F 16/9535*   (2019.01)

(52) U.S. Cl.
CPC ...... *G06F 16/24578* (2019.01); *G06F 16/435* (2019.01); *G06F 16/9535* (2019.01)

(58) Field of Classification Search
None
See application file for complete search history.

(56) References Cited

U.S. PATENT DOCUMENTS 7,007,242 B2   2/2006 Suomela et al.
7,328,216 B2   2/2008 Hofmann et al.
(Continued)

FOREIGN PATENT DOCUMENTS

CN   103077220 A   5/2013
CN   103167330 A   6/2013
(Continued)

OTHER PUBLICATIONS

"Browser Amigo by Mail.ru", https://www.youtube.com/watch?v=9IPOwpplcWM accessed on Mar. 9, 2020; https://www.youtube.com/watch?v=vdxnXZT2tQo accessed on Mar. 9, 2020, pdf 7 pages.
(Continued)

*Primary Examiner* — Uyen T Le
(74) *Attorney, Agent, or Firm* — BCF LLP

(57) ABSTRACT

A method and a system for generating a digital content recommendation including a server configured to receive a request for the digital content recommendation. Based on the request, a set of candidate content items comprising a first content item and a second content item is generated. If the first content item is non-native to a recommendation system, the server is configured to determine if the first content item's popularity on the web and within the recommendation system align with each other. If there is a discrepancy above a threshold, a popularity adjustment score is assigned to the first content item. An adjusted set of candidate content item is generated based on the popularity adjustment score. The adjusted set of candidate content items is transmitted to the electronic device for displaying thereon.

19 Claims, 9 Drawing Sheets

(56) References Cited

U.S. PATENT DOCUMENTS

| | | |
|---|---|---|
| 7,451,173 B1 | 11/2008 | Van et al. |
| 7,502,789 B2 | 3/2009 | Yao et al. |
| 7,540,051 B2 | 6/2009 | Gundersen et al. |
| D607,463 S | 1/2010 | Krieter et al. |
| 7,685,200 B2 | 3/2010 | Gunawardena et al. |
| 7,685,232 B2 | 3/2010 | Gibbs et al. |
| D613,300 S | 4/2010 | Chaudhri |
| 7,849,076 B2 | 12/2010 | Zheng et al. |
| 8,010,527 B2 | 8/2011 | Denoue et al. |
| 8,225,195 B1 | 7/2012 | Bryar et al. |
| 8,244,740 B2 | 8/2012 | Gruenhagen et al. |
| 8,271,898 B1 | 9/2012 | Mattos et al. |
| 8,285,602 B1 | 10/2012 | Yi et al. |
| 8,290,818 B1 | 10/2012 | Levitan et al. |
| 8,301,623 B2 | 10/2012 | Chakrabarti et al. |
| 8,386,955 B1 | 2/2013 | Weber et al. |
| 8,412,726 B2 | 4/2013 | Yan et al. |
| 8,429,184 B2 | 4/2013 | Ismalon |
| D682,844 S | 5/2013 | Friedlander et al. |
| 8,478,664 B1 | 7/2013 | Xavier et al. |
| 8,478,750 B2 | 7/2013 | Rao et al. |
| 8,510,252 B1 | 8/2013 | Gargi et al. |
| D691,619 S | 10/2013 | Satterfield et al. |
| 8,554,601 B1 | 10/2013 | Marsh et al. |
| D693,833 S | 11/2013 | Inose et al. |
| 8,600,968 B2 | 12/2013 | Holenstein et al. |
| 8,606,792 B1 | 12/2013 | Jackson et al. |
| 8,676,736 B2 | 3/2014 | Pilaszy et al. |
| 8,683,374 B2 | 3/2014 | Vaughan et al. |
| 8,712,937 B1 | 4/2014 | Bacus et al. |
| 8,751,507 B2 | 6/2014 | Kim et al. |
| 8,869,042 B2 | 10/2014 | Kast |
| 8,886,797 B2 | 11/2014 | Gannu et al. |
| 8,893,042 B2 | 11/2014 | Laurie et al. |
| 8,893,043 B2 | 11/2014 | Dodson et al. |
| 8,903,834 B2 | 12/2014 | Ciancutti et al. |
| 8,910,070 B2 | 12/2014 | Goodger et al. |
| 8,914,399 B1 | 12/2014 | Paleja et al. |
| 8,935,258 B2 | 1/2015 | Svore et al. |
| 8,972,391 B1 | 3/2015 | McDonnell et al. |
| 8,972,865 B1 | 3/2015 | Hansen et al. |
| 8,983,888 B2 | 3/2015 | Nice et al. |
| 8,996,530 B2 | 3/2015 | Luvogt et al. |
| 9,053,416 B1 | 6/2015 | De Leo et al. |
| D733,747 S | 7/2015 | Jeong et al. |
| 9,098,248 B2 | 8/2015 | Suzuki et al. |
| 9,098,551 B1 | 8/2015 | Fryz et al. |
| 9,122,989 B1 | 9/2015 | Morris et al. |
| D751,570 S | 3/2016 | Lee et al. |
| D751,571 S | 3/2016 | Lee et al. |
| D751,572 S | 3/2016 | Lee et al. |
| D752,601 S | 3/2016 | Lam |
| D752,636 S | 3/2016 | Yoon et al. |
| D755,805 S | 5/2016 | Zankowski et al. |
| D755,806 S | 5/2016 | Zankowski et al. |
| D755,832 S | 5/2016 | Liu et al. |
| D757,788 S | 5/2016 | Shrivastava |
| 9,348,898 B2 | 5/2016 | Nice et al. |
| 9,396,258 B2 | 7/2016 | Chu et al. |
| 9,405,741 B1 | 8/2016 | Schaaf et al. |
| D766,274 S | 9/2016 | Che et al. |
| 9,471,671 B1 | 10/2016 | Juang et al. |
| 9,473,803 B2 | 10/2016 | Wang |
| 9,569,785 B2 | 2/2017 | Alon et al. |
| 9,582,767 B2 | 2/2017 | Somekh et al. |
| 9,660,947 B1 | 5/2017 | Hart |
| 9,703,783 B2 | 7/2017 | Yi et al. |
| 9,785,883 B2 | 10/2017 | Luvogt et al. |
| 9,836,533 B1 | 12/2017 | Levi et al. |
| 9,836,765 B2 | 12/2017 | Hariri et al. |
| 9,846,836 B2 | 12/2017 | Gao et al. |
| D806,723 S | 1/2018 | Gussev et al. |
| 9,900,659 B1 | 2/2018 | Norum et al. |
| D828,369 S | 9/2018 | Arutyunyan et al. |
| D847,163 S | 4/2019 | Matsumura |
| 2002/0054164 A1 | 5/2002 | Uemura |
| 2002/0198882 A1 | 12/2002 | Linden et al. |
| 2004/0158497 A1 | 8/2004 | Brand |
| 2004/0260621 A1 | 12/2004 | Foster et al. |
| 2005/0076365 A1 | 4/2005 | Popov et al. |
| 2005/0097190 A1 | 5/2005 | Abdelhak |
| 2006/0031114 A1 | 2/2006 | Zommers |
| 2006/0041548 A1 | 2/2006 | Parsons et al. |
| 2006/0293065 A1 | 12/2006 | Chew et al. |
| 2008/0134043 A1 | 6/2008 | Georgis et al. |
| 2008/0222132 A1 | 9/2008 | Pan et al. |
| 2008/0243733 A1 | 10/2008 | Black |
| 2008/0250039 A1 | 10/2008 | Franks et al. |
| 2008/0256017 A1 | 10/2008 | Murakami |
| 2008/0266289 A1 | 10/2008 | Park |
| 2008/0294617 A1 | 11/2008 | Chakrabarti et al. |
| 2009/0006371 A1 | 1/2009 | Denoue |
| 2009/0006373 A1 | 1/2009 | Chakrabarti et al. |
| 2009/0006398 A1 | 1/2009 | Lam et al. |
| 2009/0055385 A1 | 2/2009 | Jeon et al. |
| 2009/0150935 A1 | 6/2009 | Peters et al. |
| 2009/0163183 A1 | 6/2009 | O'Donoghue et al. |
| 2009/0199113 A1 | 8/2009 | McWhinnie et al. |
| 2009/0249217 A1 | 10/2009 | Narayanaswami |
| 2009/0276368 A1 | 11/2009 | Martin et al. |
| 2009/0327941 A1 | 12/2009 | Fong et al. |
| 2010/0050067 A1 | 2/2010 | Curwen et al. |
| 2010/0070454 A1 | 3/2010 | Masuda et al. |
| 2010/0070928 A1 | 3/2010 | Goodger et al. |
| 2010/0131844 A1 | 5/2010 | Wohlert |
| 2010/0175018 A1 | 7/2010 | Petschnigg et al. |
| 2010/0205542 A1 | 8/2010 | Walman |
| 2010/0251304 A1 | 9/2010 | Donoghue et al. |
| 2010/0312650 A1 | 12/2010 | Pinckney et al. |
| 2010/0312724 A1 | 12/2010 | Pinckney et al. |
| 2011/0029636 A1 | 2/2011 | Smyth et al. |
| 2011/0035388 A1 | 2/2011 | Im et al. |
| 2011/0047136 A1 | 2/2011 | Dehn |
| 2011/0047491 A1 | 2/2011 | Hwang et al. |
| 2011/0066497 A1 | 3/2011 | Gopinath et al. |
| 2011/0072011 A1 | 3/2011 | Qiao |
| 2011/0072013 A1 | 3/2011 | Mosoi et al. |
| 2011/0107223 A1 | 5/2011 | Tilton et al. |
| 2011/0112981 A1 | 5/2011 | Park et al. |
| 2011/0125763 A1 | 5/2011 | Takanen et al. |
| 2011/0179081 A1 | 7/2011 | Ovsjanikov et al. |
| 2011/0208732 A1 | 8/2011 | Melton et al. |
| 2011/0213761 A1 | 9/2011 | Song et al. |
| 2011/0246406 A1 | 10/2011 | Lahav et al. |
| 2011/0252050 A1 | 10/2011 | Palleti et al. |
| 2011/0258185 A1 | 10/2011 | Acharya et al. |
| 2011/0302117 A1 | 12/2011 | Pinckney et al. |
| 2011/0302158 A1 | 12/2011 | Sanders |
| 2011/0320450 A1 | 12/2011 | Liu et al. |
| 2012/0030159 A1 | 2/2012 | Pilaszy et al. |
| 2012/0054794 A1 | 3/2012 | Kim et al. |
| 2012/0059707 A1 | 3/2012 | Goenka et al. |
| 2012/0143871 A1 | 6/2012 | Liebald et al. |
| 2012/0158685 A1 | 6/2012 | White et al. |
| 2012/0159337 A1 | 6/2012 | Travilla et al. |
| 2012/0191776 A1 | 7/2012 | Ruffner et al. |
| 2012/0209907 A1 | 8/2012 | Andrews et al. |
| 2012/0254097 A1 | 10/2012 | Flinn et al. |
| 2012/0278767 A1 | 11/2012 | Stibel et al. |
| 2012/0288153 A1* | 11/2012 | Tojo .............. G06T 7/174 |
| | | 382/103 |
| 2012/0304073 A1 | 11/2012 | Mandic et al. |
| 2012/0317104 A1 | 12/2012 | Radlinski et al. |
| 2012/0323349 A9 | 12/2012 | Khedouri et al. |
| 2013/0009990 A1 | 1/2013 | Hsu et al. |
| 2013/0024471 A1 | 1/2013 | Mitrovic |
| 2013/0031090 A1 | 1/2013 | Posse et al. |
| 2013/0041896 A1 | 2/2013 | Ghani et al. |
| 2013/0046772 A1 | 2/2013 | Gu et al. |
| 2013/0047112 A1 | 2/2013 | Waeller |
| 2013/0073988 A1 | 3/2013 | Groten et al. |
| 2013/0080968 A1 | 3/2013 | Hanson et al. |
| 2013/0111395 A1 | 5/2013 | Ying et al. |
| 2013/0132515 A1 | 5/2013 | Mostafa et al. |

(56) References Cited

U.S. PATENT DOCUMENTS

| | | |
|---|---|---|
| 2013/0158693 A1 | 6/2013 | Beckmann et al. |
| 2013/0159243 A1 | 6/2013 | Wei et al. |
| 2013/0179252 A1 | 7/2013 | Dong et al. |
| 2013/0194308 A1 | 8/2013 | Privault et al. |
| 2013/0204737 A1 | 8/2013 | Agarwal et al. |
| 2013/0227054 A1 | 8/2013 | Zhang et al. |
| 2013/0262478 A1 | 10/2013 | Kemp et al. |
| 2013/0290110 A1 | 10/2013 | Luvogt et al. |
| 2013/0290905 A1 | 10/2013 | Luvogt et al. |
| 2013/0297698 A1 | 11/2013 | Odero et al. |
| 2013/0311408 A1 | 11/2013 | Bagga et al. |
| 2013/0346182 A1 | 12/2013 | Cheng et al. |
| 2013/0346234 A1 | 12/2013 | Hendrick et al. |
| 2014/0006399 A1 | 1/2014 | Vasudevan et al. |
| 2014/0025532 A1 | 1/2014 | Huang et al. |
| 2014/0025609 A1 | 1/2014 | Coster et al. |
| 2014/0032678 A1 | 1/2014 | Koukoumidis et al. |
| 2014/0040776 A1 | 2/2014 | Dann et al. |
| 2014/0074856 A1 | 3/2014 | Rao et al. |
| 2014/0095967 A1 | 4/2014 | Cheng et al. |
| 2014/0101142 A1 | 4/2014 | Gomez et al. |
| 2014/0101192 A1 | 4/2014 | Sabah et al. |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1 | 7/2014 | Joo et al. |
| 2014/0207622 A1 | 7/2014 | Vijayaraghavan et al. |
| 2014/0250390 A1 | 9/2014 | Holmes et al. |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2014/0380219 A1 | 12/2014 | Cartan |
| 2015/0006286 A1 | 1/2015 | Liu et al. |
| 2015/0039406 A1 | 2/2015 | Dubey et al. |
| 2015/0052003 A1 | 2/2015 | Tang et al. |
| 2015/0058264 A1 | 2/2015 | Hughes et al. |
| 2015/0066643 A1* | 3/2015 | Choi ............... G06Q 30/0255 |
| | | 705/14.53 |
| 2015/0088921 A1 | 3/2015 | Somaiya et al. |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0169557 A1 | 6/2015 | Ciordas et al. |
| 2015/0178282 A1 | 6/2015 | Gorur et al. |
| 2015/0189070 A1 | 7/2015 | Baker |
| 2015/0220835 A1 | 8/2015 | Wilson et al. |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1 | 11/2015 | Cho et al. |
| 2015/0331859 A1 | 11/2015 | Raichelgauz et al. |
| 2015/0331951 A1 | 11/2015 | Wang et al. |
| 2015/0347358 A1 | 12/2015 | Shultz et al. |
| 2015/0347920 A1 | 12/2015 | Medlock et al. |
| 2015/0370798 A1 | 12/2015 | Ju et al. |
| 2015/0378707 A1 | 12/2015 | Park et al. |
| 2015/0379146 A1 | 12/2015 | Tonse et al. |
| 2016/0004394 A1 | 1/2016 | MacAdaan et al. |
| 2016/0021179 A1 | 1/2016 | James et al. |
| 2016/0055242 A1 | 2/2016 | Bradic et al. |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0117397 A1 | 4/2016 | Bansal et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0188739 A1 | 6/2016 | Tang et al. |
| 2016/0196244 A1 | 7/2016 | Greenberg et al. |
| 2016/0210289 A1 | 7/2016 | Esinovskaya et al. |
| 2016/0259790 A1 | 9/2016 | Mashiach et al. |
| 2016/0274744 A1 | 9/2016 | Neumann et al. |
| 2016/0275804 A1 | 9/2016 | Koppel et al. |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0060870 A1 | 3/2017 | Checkley |
| 2017/0060872 A1 | 3/2017 | Sacheti et al. |
| 2017/0061014 A1 | 3/2017 | Heiler et al. |
| 2017/0061286 A1 | 3/2017 | Kumar et al. |
| 2017/0068992 A1 | 3/2017 | Chen et al. |
| 2017/0076318 A1 | 3/2017 | Goswami et al. |
| 2017/0083965 A1 | 3/2017 | Sun |
| 2017/0091194 A1 | 3/2017 | Spiegel |
| 2017/0103343 A1 | 4/2017 | Yee et al. |
| 2017/0124093 A1 | 5/2017 | Carbonell et al. |
| 2017/0132230 A1 | 5/2017 | Muralidhar et al. |
| 2017/0293865 A1 | 10/2017 | Sandler |
| 2017/0337612 A1 | 11/2017 | Galron et al. |
| 2018/0011937 A1 | 1/2018 | Tikhonov |
| 2018/0012236 A1 | 1/2018 | Zhuo et al. |
| 2018/0014038 A1 | 1/2018 | Lamburt et al. |
| 2018/0020258 A1 | 1/2018 | Jeon et al. |
| 2018/0075137 A1 | 3/2018 | Lifar |
| 2018/0096388 A1 | 4/2018 | Lu |
| 2018/0365562 A1* | 12/2018 | Volkova ............... G06N 3/0445 |
| 2019/0069030 A1 | 2/2019 | Jackman et al. |
| 2019/0130296 A1 | 5/2019 | Basu et al. |
| 2019/0342616 A1 | 11/2019 | Domm et al. |
| 2020/0007936 A1 | 1/2020 | Salomatin et al. |
| 2020/0090247 A1 | 3/2020 | Sokolov et al. |
| 2020/0202073 A1* | 6/2020 | Ghulati ............... G06F 40/30 |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 103559262 B | 10/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |

(56) References Cited

FOREIGN PATENT DOCUMENTS

| | | |
|---|---|---|
| CN | 107491813 A | 12/2017 |
| CN | 107577682 A | 1/2018 |
| CN | 104903889 B | 5/2018 |
| CN | 108346072 A | 7/2018 |
| EP | 3032780 A | 6/2016 |
| JP | 2009015834 A | 1/2009 |
| JP | 2015079395 A | 4/2015 |
| KR | 20160064447 A | 6/2016 |
| RU | 2368006 C1 | 9/2009 |
| RU | 2417419 C2 | 4/2011 |
| RU | 2417437 C2 | 4/2011 |
| RU | 2419858 C2 | 5/2011 |
| RU | 2451986 C2 | 11/2011 |
| RU | 2481748 C2 | 5/2013 |
| RU | 2509341 C2 | 3/2014 |
| RU | 2523930 C2 | 7/2014 |
| RU | 2013101601 A | 7/2014 |
| RU | 2543315 C2 | 2/2015 |
| RU | 2577193 C2 | 3/2016 |
| RU | 2580516 C2 | 4/2016 |
| RU | 2605039 C2 | 12/2016 |
| RU | 2629449 C2 | 8/2017 |
| RU | 2632100 C2 | 10/2017 |
| RU | 2632132 C1 | 10/2017 |
| RU | 2632138 C2 | 10/2017 |
| RU | 2660602 C1 | 7/2018 |
| RU | 2017101241 A | 7/2018 |
| RU | 2663478 C2 | 8/2018 |
| WO | 2002052374 A2 | 7/2002 |
| WO | 2009087414 A1 | 7/2009 |
| WO | 2013010698 A1 | 1/2013 |
| WO | 2013189738 A1 | 12/2013 |
| WO | 2014141078 A1 | 9/2014 |
| WO | 2016030702 A1 | 3/2016 |
| WO | 2019043381 A1 | 3/2019 |

OTHER PUBLICATIONS

Search Report with regard to the counterpart RU Patent Application No. 2018132708 completed Feb. 18, 2020.
Search Report with regard to the counterpart RU Patent Application No. 2018132713 completed Feb. 21, 2020.
English Abstract for RU2017101241 retrieved on Espacenet on Mar. 12, 2020.
English Abstract for CN107577682 retrieved on Espacenet on Mar. 12, 2020.
English Abstract for CN108346072 retrieved on Espacenet on Mar. 12, 2020.
English abstract of CN 103838842 retrieved from Espacenet on Feb. 3, 2017.
Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.
Mozilla / newnewtab, https://github.com/mozilla/newnewtab, retrieved on Nov. 11, 2016, 2 pages.
Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.
Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.
Opera Help, Speed Dial, http://help.opera.com/Windows/12.10/en/speeddial.html, retrieved on Nov. 11, 2016, 2 pages.
Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.
Russian Search Report from RU patent application No. 2015141291 dated Nov. 2, 2016.
Extended European Search Report from EP16190997, Feb. 16, 2017, Herry, Tzvetanka.
European Search report from EP 16185747, Siodmok, Wojciech, Jan. 18, 2017.
English abstract of CN103678672 retrieved from Espacenet on Jan. 20, 2017.
English abstract of CN103077220 retrieved from Espacenet on Jan. 20, 2017.
Russian Search Report dated Nov. 9, 2016 from Russian Patent Application No. 2015136684.
Amatriain et al., System Architectures for Personalization and Recommendation, http://techblog.netflix.com/2013/03/system-architectures-for.html, retrieved on May 30, 2015.
English Abstract of CN303532062 retrieved on Google Translate on Apr. 4, 2017.
Kumar et al., "Knowledge Retrieval from Web Server Logs Using Web Usage Mining", International Journal of Science and Research (IJSR), 2015, vol. 4, Issue 3, pp. 2173-2176.
Kim et al., "Ranking Web Documents with Dynamic Evaluation by Expert Groups", J. Eder and M. Missikoff (Eds.), CAISE, 2003, pp. 437-448.
Russian Search Report from RU patent application No. 2016127447 dated Feb. 7, 2017.
Pilaszy et al., "Fast ALS-based Matrix Factorization for Explicit and Implicit Feedback Datasets", RECSYS'10, 2010, pp. 71-78.
U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/262,332, filed Sep. 12, 2016.
Design U.S. Appl. No. 29/590,781, filed Jan. 13, 2017.
U.S. Appl. No. 15/592,745, filed May 11, 2017.
U.S. Appl. No. 15/606,326, filed May 26, 2017.
U.S. Appl. No. 15/606,658, filed May 26, 2017.
U.S. Appl. No. 15/607,555, filed May 29, 2017.
Russian Search Report from RU patent application No. 2015141108 dated Sep. 7, 2016.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
Youtube Account: RnStore, "Zmags Demo", (May 19, 2011 ), times stamp 1:54/3:56, 2:20/3:56, PDF Attached, URL: https://www.youtube.com/watch?v=AsBrLdoEJgA, received from USPTO on May 11, 2018 with regard to the U.S. Appl. No. 15/263,493.
Youtube Account: iappletech128, "Close Tabs in Safari by Swiping", (Oct. 20, 2013), time stamp 0:20-0:35/1 :18, PDF Attached, URL: https://www.youtube.com/watch?v=V8TTbYrFSmg, received from USPTO on May 11, 2018 with regard to the U.S. Appl. No. 15/263,493.
Youtube Account: macmostvideo, "Viewing Photos With the Finder (MacMost Now 612)", (Sep. 30, 2011 ), time stamp 2:05-2:25, PDF Attached, URL: https://www.youtube.com/watch?v=tYoJI6G7Hkg, received from USPTO on May 11, 2018 with regard to the U.S. Appl. No. 15/263,493.
European Examination Report with regard to the counterpart patent application No. EP 16190999.9 dated Jun. 29, 2018.
U.S. Appl. No. 16/010,152, filed Jun. 15, 2018.
Notice of Allowance with regard to the counterpart U.S. Appl. No. 15/592,745 dated Oct. 11, 2018.

(56) References Cited

OTHER PUBLICATIONS

Disclosed Anonymously, "System, Method and Computer Program Product for Generating a Relationship-Based Recommendation", Apr. 28, 2006, 21 pages (in the Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (in the Notice of Allowance with regard to the counterpart U.S. Appl. No. 15/592,745 dated Oct. 11, 2018).
U.S. Appl. No. 16/009,929, filed Jun. 15, 2018.
Design U.S. Appl. No. 29/703,684, filed Aug. 29, 2019.
U.S. Appl. No. 16/370,286, filed Mar. 29, 2019.
U.S. Appl. No. 16/372,553, filed Apr. 2, 2019.
U.S. Appl. No. 16/371,624, filed Apr. 1, 2019.
U.S. Appl. No. 16/503,546, filed Jul. 4, 2019.
Notice of Allowance received with regard to the counterpart U.S. Appl. No. 29/590,781 dated Dec. 20, 2019.
Search Report with regard to the counterpat RU Patent Application No. 2018132716 completed Nov. 25, 2019.
Office Action with regard to the counterpart U.S. Appl. No. 16/010,152 dated Apr. 2, 2021.
Office Action with regard to the counterpart U.S. Appl. No. 16/009,929 dated Mar. 16, 2021.
Search Report with regard to the counterpart RU Patent Application No. 2018135362 completed Mar. 26, 2020.
English Abstract for CN104903889 retrieved on Espacenet on Apr. 16, 2020.
Office Action with regard to the counterpart U.S. Appl. No. 16/371,624 dated Dec. 9, 2020.
Search Report with regard to the counterpart RU Patent Application No. 2018135455 completed May 22, 2020.
Office Action with regard to the counterpart U.S. Appl. No. 16/010,152 dated Apr. 7, 2020.
Notice of Allowance with regard to the counterpart U.S. Appl. No. 16/370,286 dated Mar. 31, 2020.
English Abstract for CN104317835 retrieved on Espacenet on May 7, 2018.
English Abstract for CN105893398 retrieved on Espacenet on May 7, 2018.
English Abstract for CN106446195 retrieved on Espacenet on May 7, 2018.
English Abstract for KR20160064447 retrieved on Espacenet on May 7, 2018.
English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
English Abstract for CN103473354 retrieved on Espacenet on Jan. 4, 2019.
English Abstract for JP2009015834 retrieved on Espacenet on Mar. 21, 2019.
Notice of Allowance with regard to the counterpart U.S. Appl. No. 15/262,332 dated Mar. 18, 2019.
Office Action with regard to the counterpart U.S. Appl. No. 15/592,745 dated Mar. 8, 2019.
Office Action with regard to the counterpart U.S. Appl. No. 15/262,318 dated Apr. 1, 2019.
Search Report with regard to the counterpart U.S. Patent Application No. 2017140972 completed May 13, 2019.
Office Action with regard to the counterpart U.S. Appl. No. 15/263,493 dated May 9, 2019.
Martin Beck, "Facebook Now Asks Why You're Hiding That Ad, to Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
Notice of Allowance received with regard to the counterpart U.S. Appl. No. 15/606,658 dated Jun. 26, 2019.
Office Action with regard to the counterpart U.S. Appl. No. 15/607,555 dated Apr. 19, 2021.
Office Action with regard to the counterpart U.S. Appl. No. 15/607,555 dated Jun. 11, 2021.
Levy et al., "Neural Ward Embedding as Implicit Matrix Factorization", Advances in Neural Information Processing, 2014, p. 2177-2185 (Year: 2014)—Office Action with regard to the counterpart U.S. Appl. No. 15/607,555 dated Jun. 11, 2021.

* cited by examiner

METHOD AND SYSTEM FOR GENERATING DIGITAL CONTENT RECOMMENDATION

CROSS-REFERENCE

The present application claims priority to Russian Patent Application No. 2018135455, filed Oct. 9, 2018, entitled "Method and System for Generating Digital Content Recommendation," the entirety of which is incorporated herein by reference.

FIELD

The present technology relates to recommendation systems in general and specifically to a method and a system for generating a digital content recommendation.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment-related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows a priori that she/he wants to search. In other words, if the user is interested in obtaining information about the most popular destinations in Spain (i.e. a known search topic), the user could submit a search query: "The most popular destinations in Spain?" The search engine will then present a ranked list of Internet resources that are potentially relevant to the search query. The user can then browse the ranked list of search results in order to obtain information she/he is interested in as it related to places to visit in Spain. If the user, for whatever reason, is not satisfied with the uncovered search results, the user can rerun the search, for example, with a more focused search query, such as "The most popular destinations in Spain in the summer?", "The most popular destinations in the South of Spain?", "The most popular destinations for a culinary getaway in Spain?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD™ recommendation system, which system aggregates and recommends content from various social networks. The FLIPBOARD recommendation system presents the uncovered content in a "magazine style" format, where the user can "flip" through the pages with the recommended/aggregated content. The recommendation system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

Another example of the recommendation system is YANDEX.ZEN™ recommendation system. The Yandex.Zen recommendation system recommends digital content (such as articles, news, and video in a personalized feed on the Yandex.Browser start screen). As the user browses the Yandex.Zen recommended content, the server acquires explicit (by asking whether the user likes to see more of such content in the user's feed) or implicit (by observing user content interactions) feedback. Using the user feedback, the Yandex.Zen server continuously improves the content recommendations presented to the given user.

Recommendation systems provide personalized content to users based on previous user interactions with the recommendation service that can be indicative of user preferences for some particular content rather than other content.

Typically, the recommended content comes from two principal sources—a native source and an external (non-native) source.

The external sources are web sites on the Internet, such as news agencies, news aggregators, blogs and other sources of content items, crawled or received by the recommendation systems, which can be presented to the users of the recommendation systems.

On the other hand, the native sources are "bloggers" (or broadly speaking, content authors) that post content using the recommendation system as a platform. This can be particularly convenient for those users of the recommendation system who wish to publish digital content but do no wish to spend time and/or money for establishing a publication platform.

In any event, one of the problems associated with providing content to users is the possibility that the content determined to be relevant to a user by the recommendation system, is in fact not very relevant. For example, many webpages, commonly known as "clickbait", entice users to access them by providing sensational, exaggerating titles, while providing irrelevant content on the subject matter.

Generally speaking, such content tends to originate from external sources. This is because "bloggers" that post native content using the recommendation system risk the possibility of being removed from the platform and be blacklisted.

On the other hand, applying such restricting measures to content originating from external sources may be more difficult. As noted above, the number of internet resources has grown and keeps on growing by the day, and therefore blacklisting a particular source may not fully solve the issue.

Needless to say, when a user is provided with clickbait as a recommended content, user experience suffers. Indeed, frequent access to irrelevant or poor quality content items prevents the user from fully appreciating the recommendation system.

United States Patent Application Publication No. US20160188739A1 published on Jun. 30, 2016, to Facebook Inc., and titled "Systems and Methods for Throttling Click Bait" teaches systems, methods, and non-transitory computer readable media configured to determine a value of a utility factor associated with a content item corresponding to a link. An optimized utility value relating to an interaction type of an outbound click is determined based on the value of the utility factor. An expected utility score associated with the content item is generated based on the optimized utility value to determine potential presentation of the content item to a user.

United States Patent Application Publication No. US20180012236A1 published on Jan. 11, 2018 to Facebook Inc., and titled "Systems and Methods for Analyzing Interaction-Bait Content Based on Classifier Models" teaches systems, methods, and non-transitory computer-readable media that can select one or more content items that are associated with one or more interactions that each at least meet a specified interaction metric threshold. Data associated with the one or more content items can be acquired. A classifier can be developed based on the data associated with the one or more content items. At least some of the one or more content items can be identified, based on the classifier, as having at least a threshold confidence score of being interaction-bait content.

U.S. Pat. No. 9,098,551 B1 granted on Aug. 4, 2015, to Google LLC and titled "Method and System for Ranking Content by Click Count and Other Web Popularity Signals" teaches a computer-implemented method for ranking content entities by their associated web pages and search queries. The method comprises: at a computer system having memory and one or more processors: performing a textual analysis on one or more predefined websites to identify a plurality of reference web pages, further including determining content information and one or more search queries for each reference web page; for a respective content entity: identifying a subset of the reference web pages and the corresponding search queries based on the content information of the reference web pages and query terms of the corresponding search queries; and determining a popularity ranking for the respective content entity based on user interactions with the identified subset of reference web pages and the corresponding search queries; and selecting at least a subset of the content entities for display to an end user in accordance with their respective popularity rankings.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

As has been alluded to above, the recommended content provided by the recommendation system may originate from two sources—the native source and the external source.

Developers of the present technology have appreciated that it may be desirable, as part of providing recommendations of content items to users, to identify the content originating from external sources, and compare the system-specific popularity of the external source with the popularity of the external source on the Internet as a whole.

As it will be made more apparent in the present disclosure, the system-specific popularity is a share of interaction of the external sources within the recommendation system having a common source of origin relative to the totality of the digital content accessible by the recommendation system.

On the other hand, the popularity of the external source is a "per domain popularity", meaning that it is a share of interaction of the web resources having a same domain name relative to a portion of the totality of web resources accessible on the Internet as a whole.

By comparing the system-specific popularity and the popularity of the external source associated with a non-native content item, it is possible to determine whether the popularity of the non-native content item is aligned on the Internet and the recommendation system.

In accordance with a first broad aspect of the present technology, there is provided a computer implemented method for generating a digital content recommendation, the digital content recommendation to be displayed on an electronic device associated with a user. The method is executed by a server of a recommendation system connectable to the electronic device via a communication network. The recommendation system executes a ranking algorithm. The method comprising: receiving, from the electronic device, via the communication network, a request for the digital content recommendation; generating a set of digital candidate content items responsive to the request, the generating being executed by ranking, by a ranking algorithm, at least a portion of an entirety of digital content items available at the recommendation system, the set of digital candidate content items comprising at least a first digital content item associated with a first ranking score assigned by the ranking algorithm and a second digital content item associated with a second raking score assigned by the ranking algorithm, the first ranking score and the second ranking score being indicative of a relevance of the first digital content item and the digital second content item to a user of the electronic device; in response to the first digital content item being accessible both within the recommendation system and at a network resource accessible via the communication network: determining a system specific popularity score indicative of a popularity of the first digital content item within the recommendation system; determining a web popularity value indicative of the popularity of the first digital content item at the network resource; determining a popularity adjustment score to the first digital content item, the popularity adjustment score being based on the system-specific popularity score and the web popularity value associated with the first digital content item; generating an adjusted set of ranked candidate content items by adjusting the first ranking score of the first digital content item based, at least in part, on the popularity adjustment score; and transmitting, by the server, the adjusted set of candidate digital content items to the electronic device for displaying thereon.

In some embodiments of the method, the first digital content item originates from a first source and the second digital content item originates from a second source.

In some embodiments of the method, the recommendation system comprises a plurality of digital content items, and wherein the determining the system specific popularity score comprises: determining, for the plurality of digital content items, a total number of clicks executed by a plurality of electronic devices over a period of time; identifying a subset of the plurality of digital content items originating from the first source; determining a number of clicks associated with the subset of the plurality of digital content items over the period of time; and dividing the number of clicks by the total number of clicks.

In some embodiments of the method, the communication network is coupled to a plurality of network resources accessible by the plurality of electronic devices, and wherein the determining the web popularity value comprises: determining, for the plurality of network resources, a total number of accesses by the plurality of electronic device over the period of time; retrieving a domain name associated with a uniform resource locator (URL) of the first digital content item; identifying a subset of the plurality of network resources having a URL comprising the domain name; determining a number of accesses by the plurality of electronic device to the subset of the plurality of network resources over the period of time; dividing the number of accesses by the total number of accesses.

In some embodiments of the method, determining the total number of accesses and the number of accesses comprises analyzing at least one of: search logs associated with the plurality of electronic devices; browser logs associated with the plurality of electronic devices; and web analytic data collected by a web analytic application coupled to the server.

In some embodiments of the method, determining the popularity adjustment score comprises: determining a ratio of the web popularity value to the system specific popularity score; applying the ratio to a sigmoid function to obtain a probability value indicative of a likelihood that the system specific popularity score of the first content item is aligned with the web popularity value; determining if the probability value is above a threshold; and; wherein the popularity adjustment score is one of: a first score in response to determining that the probability value is above the threshold; and a second score in response to determining that the probability value is below the threshold.

In some embodiments of the method, generating the adjusted set of ranked candidate digital content items comprises: calculating an adjusted first ranking score associated with the first digital content item based at least on the popularity adjustment score; and re-ranking, the first digital content item based on the adjusted first ranking score.

In some embodiments of the method, e adjusted first ranking score is lower than the first ranking score.

In some embodiments of the method, the adjusted set of candidate digital content items excludes the first digital content item.

In some embodiments of the method, the first digital content item being a non-native content item non-native to the recommendation system; and the second digital content item being a native digital content item native to the recommendation system, the second source being a content channel that is native to the recommendation system.

In some embodiments of the method, the first digital content item and the second digital content item is at least one of: an image; a text; and a video.

In accordance with another broad aspect of the present technology, there is provided a system for generating a digital content recommendation, the digital content recommendation for displaying on an electronic device associated with a user. The system comprises a server of a recommendation system connectable to the electronic device via a communication network. The recommendation system executes a ranking algorithm. The server comprising a processor configured to: receive, from the electronic device, via the communication network, a request for the digital content recommendation; generate a set of digital candidate content items responsive to the request, the generating being executed by ranking, by a ranking algorithm, at least a portion of an entirety of digital content items available at the recommendation system, the set of digital candidate content items comprising at least a first digital content item associated with a first ranking score assigned by the ranking algorithm and a second digital content item associated with a second raking score assigned by the ranking algorithm, the first ranking score and the second ranking score being indicative of a relevance of the first digital content item and the digital second content item to a user of the electronic device; in response to the first digital content item being accessible both within the recommendation system and at a network resource accessible via the communication network: determine a system specific popularity score indicative of a popularity of the first digital content item within the recommendation system; determine a web popularity value indicative of the popularity of the first digital content item at the network resource; determine a popularity adjustment score to the first digital content item, the popularity adjustment score being based on the system-specific popularity score and the web popularity value associated with the first digital content item; generate an adjusted set of ranked candidate content items by adjusting the first ranking score of the first digital content item based, at least in part, on the popularity adjustment score; and transmit, by the server, the adjusted set of candidate digital content items to the electronic device for displaying thereon.

In some embodiments of the system, the first digital content item originates from a first source and the second digital content item originates from a second source.

In some embodiments of the system, the recommendation system comprises a plurality of digital content items, and wherein to determine the system specific popularity score, the processor is configured to: determine, for the plurality of digital content items, a total number of clicks executed by a plurality of electronic devices over a period of time; identify a subset of the plurality of digital content items originating from the first source; determine a number of clicks associated with the subset of the plurality of digital content items over the period of time; divide the number of clicks by the total number of clicks.

In some embodiments of the system, the communication network is coupled to a plurality of network resources accessible by the plurality of electronic devices, and wherein to determine the web popularity value, the processor is configured to: determine, for the plurality of network resources, a total number of accesses by the plurality of electronic device over the period of time; retrieve a domain name associated with a uniform resource locator (URL) of the first digital content item; identify a subset of the plurality of network resources having a URL comprising the domain name; determine a number of accesses by the plurality of electronic device to the subset of the plurality of network resources over the period of time; divide the number of accesses by the total number of accesses.

In some embodiments of the system, to determine the total number of accesses and the number of accesses, the processor is configured to analyze at least one of: search logs associated with the plurality of electronic devices; browser logs associated with the plurality of electronic devices; and web analytic data collected by a web analytic application coupled to the server.

In some embodiments of the system, to determine the popularity adjustment score, the processor is configured to:

determine a ratio of the web popularity value to the system specific popularity score; apply the ratio to a sigmoid function to obtain a probability value indicative of a likelihood that the system specific popularity score of the first content item is aligned with the web popularity value; determine if the probability value is above a threshold; and wherein the popularity adjustment score is one of: a first score in response to determining that the probability value is above the threshold; and a second score in response to determining that the probability value is below the threshold.

In some embodiments of the system, to generate the adjusted set of ranked candidate digital content items, the processor is configured to: calculate an adjusted first ranking score associated with the first digital content item based at least on the popularity adjustment score; and re-rank, the first digital content item based on the adjusted first ranking score.

In some embodiments of the system, the adjusted first ranking score is lower than the first ranking score.

In some embodiments of the system, the adjusted set of candidate digital content items excludes the first digital content item.

In some embodiments of the system, the first digital content item being a non-native content item non-native to the recommendation system; and the second digital content item being a native digital content item native to the recommendation system, the second source being a content channel that is native to the recommendation system.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
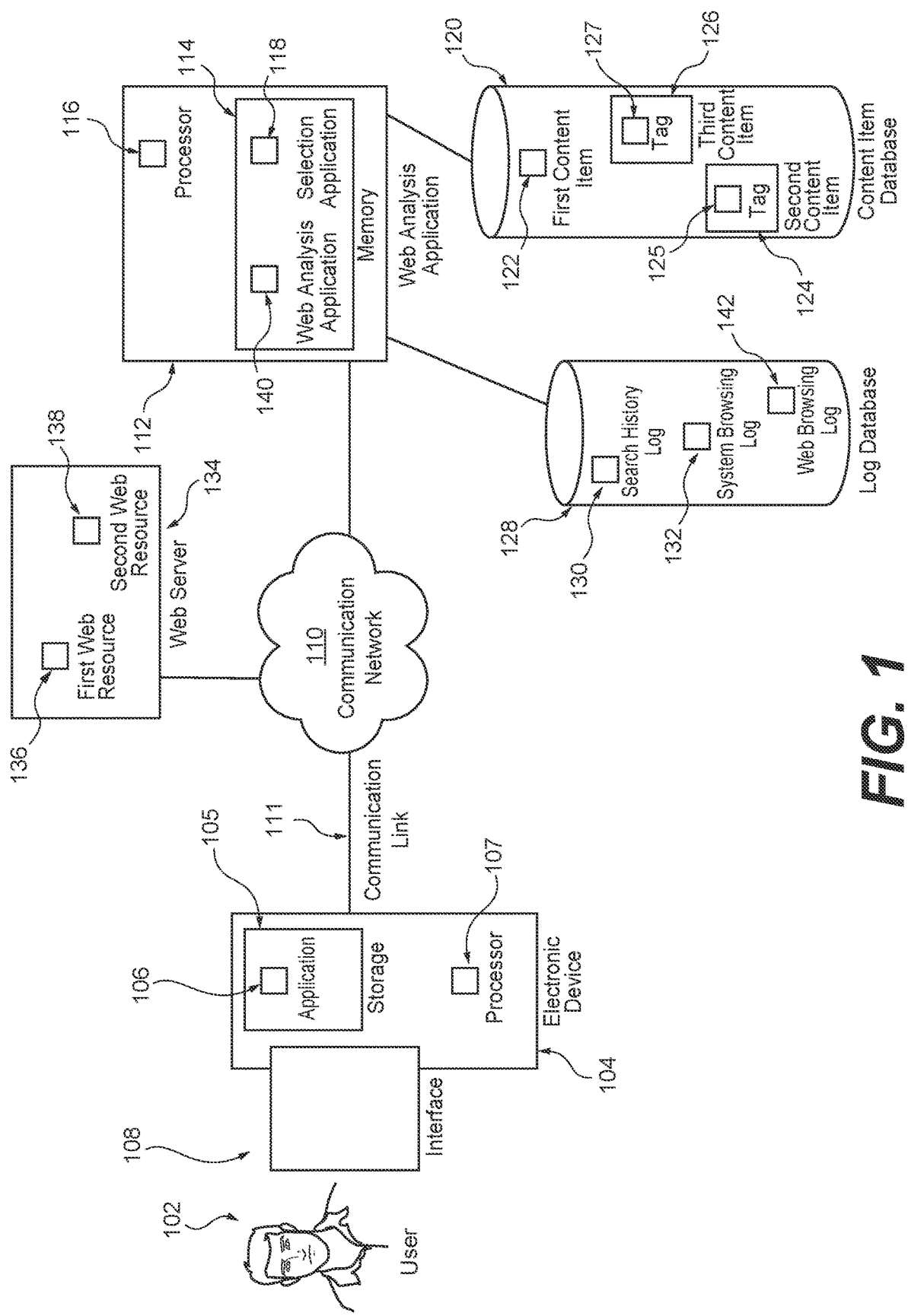
FIG. 1 depicts a schematic diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of greater complexity.

Generally speaking, the system 100 is configured to provide content recommendations to a user 102 of the system 100. The user 102 may be a subscriber to a recommendation service provided by the system 100. However, the subscription does not need to be explicit or paid for. For example, the user 102 can become a subscriber by virtue of downloading a recommendation application from the system 100, by registering and provisioning a login/password combination, by registering and provisioning user preferences and the like. As such, any system variation configured to generate content recommendations for the given user can be adapted to execute embodiments of the present technology, once teachings presented herein are appreciated.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 104 comprises a permanent storage 105. The permanent storage 105 may encompass one or more storage media and generally provides a place to store computer-executable instructions executable by a processor 107. By way of an example, the permanent storage 105 may be implemented as a computer-readable storage medium including Read-Only Memory (ROM), hard disk drives (HDDs), solid-state drives (SSDs), and flash-memory cards.

The electronic device 104 comprises hardware and/or software and/or firmware (or a combination thereof), as is known in the art, to execute a recommendation application 106. Generally speaking, the purpose of the recommendation application 106 is to enable the user to receive (or otherwise access) content recommendations provided by the system 100, as will be described in greater detail herein below.

How the recommendation application 106 is implemented is not particularly limited. One example of the recommendation application 106 may include a user accessing a web site associated with a recommendation service to access the recommendation application 106. For example, the recommendation application 106 can be accessed by typing in (or otherwise copy-pasting or selecting a link) an URL associated with the recommendation service. Alternatively, the recommendation application 106 can be an app downloaded from a so-called app store, such as APPSTORE™ or GOOGLEPLAY™ and installed/executed on the electronic device 104. It should be expressly understood that the recommendation application 106 can be accessed using any other suitable means. In yet additional embodiments, the recommendation application 106 functionality can be incorporated into another application, such as a browser application (not depicted) or the like. For example, the recommendation application 106 can be executed as part of the browser application, and when the user 102 starts the browser application, the recommendation application 106 can be executed.

Generally speaking, the recommendation application 106 comprises a recommendation interface 108, the recommendation interface 108 being displayed on a screen (not separately numbered) of the electronic device 104.

Figure 2:
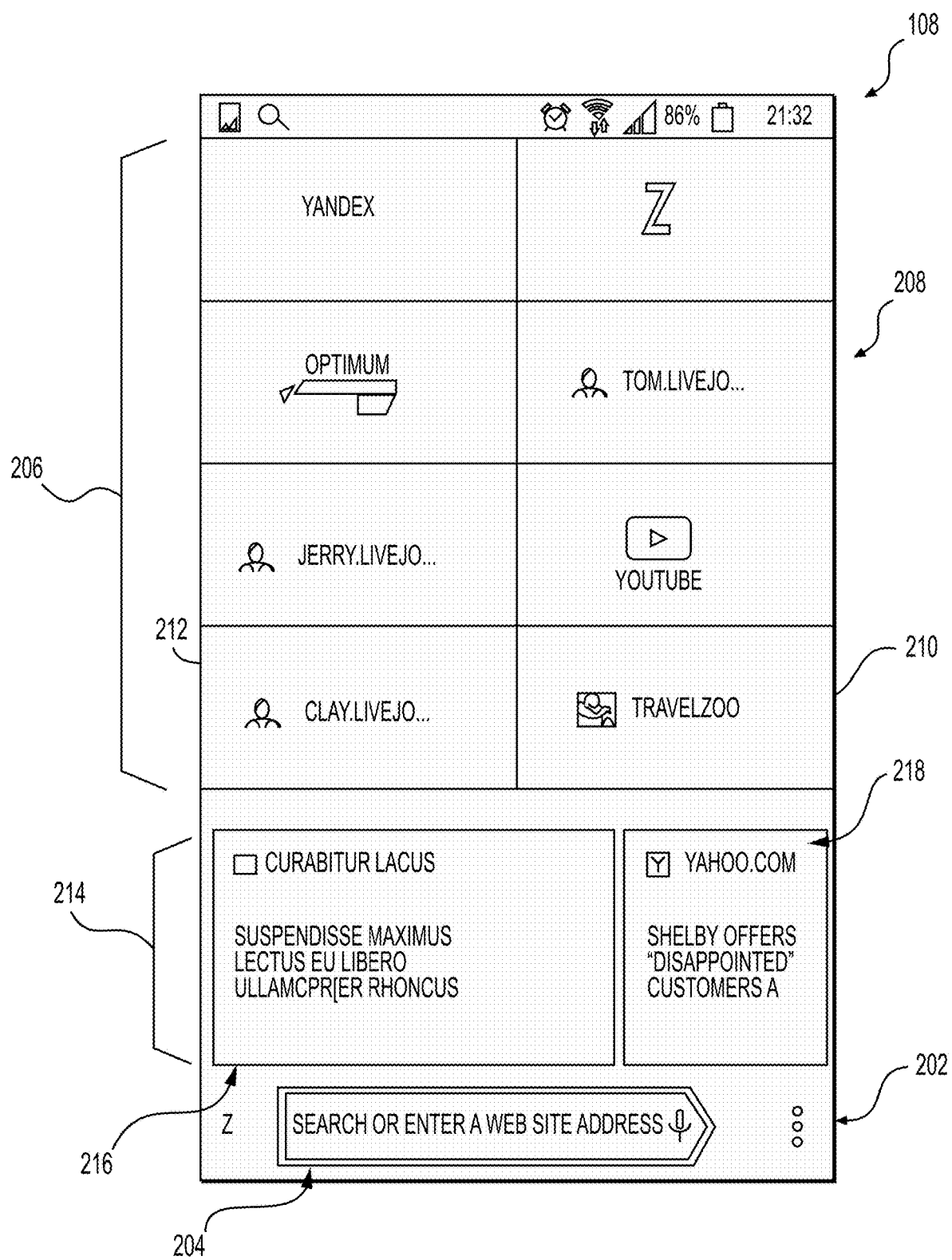
FIG. 2 depicts a screen shot of a recommendation interface implemented in accordance with a non-limiting embodiment of the present technology, the recommendation interface being depicted as displayed on the screen of an electronic device of the system of FIG. 1, the electronic device being implemented as a smart phone.

With reference to FIG. 2, there is depicted a screen shot of the recommendation interface 108 implemented in accordance with a non-limiting embodiment of the present technology (the example of the recommendation interface 108 being depicted as displayed on the screen of the electronic device 104 being implemented as a smart phone).

In some embodiments of the present technology the recommendation interface 108 is presented when the user 102 of the electronic device 104 actuates (i.e. executes, run, background-run or the like) the recommendation application 106. Alternatively, the recommendation interface 108 can be presented when the user 102 opens a new browser window and/or activates a new tab in the browser application. For example, in some embodiments of the present technology, the recommendation interface 108 can act as a "home screen" in the browser application.

The recommendation interface 108 includes a search interface 202. The search interface 202 includes a search query interface 204. The search query interface 204 can be implemented as an "omnibox" which allows entry of a search query for executing a search or a network address (such as a Universal Remote Locator) for identifying a network resource (such as a web site) to be accessed. However, the search query interface 204 can be implemented as configured to receive one or both of: entry of the search query for executing the search or the network address (such as a Universal Remote Locator) for identifying the network resource (such as a web site) to be accessed.

The recommendation interface 108 further includes a links interface 206. The links interface 206 includes a plurality of tiles 208—of which eight are depicted in FIG. 2—only two of which are numbered in FIG. 2—a first tile 210 and a second tile 212.

Using the example of the first tile 210 and the second tile 212—each of the plurality of tiles 208 includes (or acts as) a link to either (i) a web site marked as "favourite" or otherwise marked by the user 102, (ii) a previously visited web site or (iii) the like. The plurality of tiles 208, in the depicted embodiment, is visually presented to the user 102 as square buttons with a logo and/or a name of the resource depicted therein, the logo and the name for enabling the user 102 to identify which resource the particular one of the plurality of tiles (not separately numbered) is linked to. However, it should be expressly understood that the visual representation of some or all of the plurality of tiles 208 can be different. As such, some or all of the plurality of tiles 208 can be implemented as differently shaped buttons, as hyperlinks presented in a list or the like.

As an example, the first tile 210 contains a link to a TRAVELZOO™ web site and the second tile 212 contains a link to a personal live journal web site. Needless to say, the number and content of the individual ones of the plurality of tiles 208 is not particularly limited.

For example, the number of the tiles within the plurality of tiles 208 can be pre-selected by the provider of the recommendation application 106. In some embodiments of the present technology, the number of tiles within the plurality of tiles 208 is pre-selected based on the size and/or resolution of the screen of the electronic device 104 executing the recommendation application 106. For example, a first number of tiles can be pre-selected for the electronic device 104 executed as a smartphone, a second number of tiles can be pre-selected for the electronic device 104 executed as a tablet, and a third number of tiles can be pre-selected for the electronic device 104 executed as a laptop or desktop computer.

The recommendation interface 108 further includes a digital content recommendation 214. The digital content recommendation 214 includes one or more recommended digital content items, such as a first recommended digital content item 216 and a second recommended digital content item 218 (the second recommended digital content item 218 only partially visible in FIG. 2). Naturally, the digital content recommendation 214 can have more recommended digital content items. In the embodiment depicted in FIG. 2 and in those embodiments where more than one recommended digital content item are present, the user 102 can scroll through the digital content recommendation 214. The scrolling can be achieved by any suitable means. For example, the user 102 can scroll the content of the digital content recommendation 214 by means of actuating a mouse device (not depicted), a key board key (not depicted) or interacting with a touch-sensitive screen (not depicted) or associated with the electronic device 104.

In response to the user clicking one of the first recommended digital content item 216 or the second recommended digital content item 218, the user is directed to a website associated with the first recommended digital content item 216 or the second recommended digital content item 218.

The example provided in FIG. 2 is just one possible implementation of the recommendation interface 108. Another example of the implementation of the recommendation interface 108, as well as an explanation of how the user 102 can interact with the recommendation interface 108 is disclosed in a co-owned Russian Patent Application entitled A COMPUTER-IMPLEMENTED METHOD OF GENERATING A CONTENT RECOMMENDATION INTERFACE, filed on May 12, 2016, and bearing an application number 2016118519; content of which is incorporated by reference herein in its entirety.

How the content for the digital content recommendation 214 is generated will be described in greater detail herein below.

Returning to the description of FIG. 1, the electronic device 104 comprises a communication interface (not depicted) for two-way communication with a communication network 110 via a communication link 111. In some non-limiting embodiments of the present technology, the communication network 110 can be implemented as the Internet. In other embodiments of the present technology, the communication network 110 can be implemented differently, such as any wide-area communication network, local-area communication network, a private communication network and the like.

How the communication link 111 is implemented is not particularly limited and depends on how the electronic device 104 is implemented. Merely as an example and not as a limitation, in those embodiments of the present technology where the electronic device 104 is implemented as a wireless communication device (such as a smart phone), the communication link 111 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 104, the communication link 111 and the communication network 110 are provided for illustration purposes only. As such, those skilled in the art will easily appreciate other specific implementational details for the electronic device 104, the communication link 111, and the communication network 110. As such, by no means the examples provided hereinabove are meant to limit the scope of the present technology.

The system 100 further includes a recommendation server 112. The recommendation server 112 can be implemented as a conventional computer server. In an example of an embodiment of the present technology, the recommendation server 112 can be implemented as a Dell™ PowerEdge™ Server running the Microsoft™ Windows Server™ operating system. Needless to say, the recommendation server 112 can be implemented in any other suitable hardware, software, and/or firmware, or a combination thereof. In the depicted non-limiting embodiments of the present technology, the recommendation server 112 is a single server. In alternative non-limiting embodiments of the present technology, the functionality of the recommendation server 112 may be distributed and may be implemented via multiple servers.

The recommendation server 112 comprises a communication interface (not depicted) structured and configured to communicate with various entities (such as the electronic device 104 and other devices potentially coupled to the communication network 110) via the communication network 110. Similarly to the electronic device 104, the recommendation server 112 comprises a server memory 114 which comprises one or more storage media and generally provides a place to store computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard drives (HDDs), solid-state drives (SSDs), and flash-memory cards.

In some embodiments, the recommendation server 112 can be operated by the same entity that has provided the afore-described recommendation application 106. For example, if the recommendation application 106 is a Yandex.Zen™ recommendation system, the recommendation server 112 can be operated by Yandex LLC of Lev Tolstoy Street, No. 16, Moscow, 119021, Russia. In alternative embodiments, the recommendation server 112 can be operated by an entity different from the one who has provided by the aforementioned recommendation application 106.

In accordance with the present technology, the recommendation server 112 is configured to execute a content selection application 118. The manner in which the content selection application 118 is implemented will be described in detail below. For now, suffice it to say that the content selection application 118 is configured to select one or more digital content items as the digital content recommendation 214.

To that end, the recommendation server 112 is communicatively coupled to a digital content item database 120 via a dedicated link (not numbered). In alternative implementations, the digital content item database 120 may be communicatively coupled to the recommendation server 112 via the communication network 110 without departing from the teachings of the present technology. Although the digital content item database 120 is illustrated schematically herein as a single entity, it is contemplated that the digital content item database 120 may be configured in a distributed manner.

The digital content item database 120 is populated with a plurality of digital content items. Just as an illustration within FIG. 1, the digital content item database 120 includes a first digital content item 122 a second digital content item 124, and a third digital content item 126, digital content item Broadly speaking, the plurality of digital content items stored within the digital content item database 120 can be divided into two types of digital content item based on their source.

For example, the first digital content item 122 may be a "native" digital content item to the recommendation system, meaning that the first digital content item 122 originates from a native content channel, which is affiliated with the recommendation application 106. As such, in some embodiments of the present technology, the recommendation server 112 may provide a platform for digital content generation and publication. This can be particularly convenient for those users of the recommendation server 112 who wish to publish digital content (such as blog posts, videos, and the like) but do not wish to spend time and/or money for establishing a publication platform On the other hand, the second digital content item 124 and the third digital content item 126 can be "non-native" to the recommendation system, or in other words, from a source that is external to the recommendation server 112. For example, the second digital content item 124 may be a news item published on the web from a news publisher not affiliated with the recommendation application 106. In another example, the third digital content item 126 may be a blog item published on the web by an entity not affiliated with the recommendation application 106. Just as an example, non-native digital content item may include, but is not limited to, web resources associated with:
 a news item;
 a publication on the Internet;
 a web resource;
 a post on a social media web site;
 a new item to be downloaded from an application store;
 a new song (music track) to play/download from a resource;
 an audiobook to play/download from a resource;
 a podcast to play/download from a resource;
 a new movie (video clip) to play/download from a resource; and
 a product to be bought from a resource.

The manner in which the digital content item database 120 is populated with non-native digital content items (i.e. the second digital content item 124 and the third digital content item 126) is not limited. For example, the second digital content item 124 which originates from a news publisher may be received and stored in the digital content item database 120 via RSS feeds of the news publisher. In another example, the recommendation server 112 is also configured to execute a crawling function to gather non-native digital content items coupled to the communication network 110, and to that end comprises a crawler application (not shown). Generally speaking, the crawler application is configured to periodically access web servers (described below) coupled to the communication network 110 to identify and store within the digital content item database 120 the crawled non-native digital content items.

In some embodiments, the digital content item database 120 stores a tag associated with the non-native digital content items (i.e. the second digital content item 124 and the third digital content item 126). As such, the second digital content item 124 is associated with a first tag 125, and the third digital content item 126 is associated with a second tag 127.

In some embodiments, each of the first tag 125 and the second tag 127 is representative of a top level domain of the web resource from which the second digital content item 124 and the third digital content item 126 has been received from, respectively. For example, if the first second digital content item 124 is a digital content item crawled from a news agency, say www.cbc.ca, the first tag 125 is associated with all the digital content items retrieved from web resources having the top level domain name "cbc.ca". In the context of the present specification, the term "web resource" refers to any network resource (such as a web page, web site), which its content is presentable visually by the electronic device 104 to the user, via the browser application (not shown), and associated with a particular web address (such as a URL).

The recommendation server 112 is further communicatively coupled to a log database 128 via a dedicated link (not numbered). In alternative embodiments, the log database 128 may be communicatively coupled to the recommendation server 112 via the communication network 110 without departing from the teachings of the present technology. Although the log database 128 is illustrated schematically herein as a single entity, it is contemplated that the log database 128 may be configured in a distributed manner.

The log database 128 is configured to store previously collected data associated with the one or more electronic devices. In some non-limiting embodiments, the log database comprises three kinds of logs: a search history log 130, a recommendation system browsing log 132, and a web browsing log 142.

Generally speaking, the "search strings" which one or more users input into the search query interface 204, as well as search action data are stored in the search history log 130. Needless to say, the search history log 130 may further store the "search strings" inputted into a search engine application, such as Google™, or Yandex™ (not shown) as well as the associated search action data.

The recommendation system browsing log 132 stores system-specific browsing history data by the one or more electronic devices when executing the recommendation application 106. Examples of system-specific browsing history data that may be stored within the recommendation system browsing log 132 includes, but not limited to:
 The user 102 clicking a given digital content item;
 The user 102 "scrolling over" the given digital content item;
 The user 102 "liking" or "disliking" the given digital content item or the content channel associated with the given digital content item;
 The user 102 sharing the given digital content item;
 The user 102 clicking (or otherwise selecting) the given digital content item; and
 The user 102 spending time consulting the given digital content item.

Finally, the web browsing log 142 stores web browsing history data (described below) by the one or more electronic devices when navigating the web.

The system further includes a web server 134 coupled to the communication network 110. The web server 134 can (but does not have to) be implemented in a similar manner to the recommendation server 112. In the depicted embodiments of the present technology, the web server 134 is a single server. In alternative non-limiting embodiments of the present technology, the functionality of the web server 134 may be distributed and implemented via multiple servers.

In some embodiments of the present technology, and generally speaking, the web server 134 functions as a host for a first web resource 136 and a second web resource 138.

Just as an example, the second digital content item 124 can be accessible from the first web resource 136 and the third digital content item 126 can be accessible from the second web resource 138. Although in the depicted non-limiting embodiment of the present technology, the web server 134 hosts only the first web resource 136 and the second web resource 138, it is not limited as such and, may host more or fewer than two web resources.

Returning to the recommendation server 112, the recommendation server 112 is configured to execute (or otherwise has access to) a web analytic application 140, such as, for example, Yandex.Metrica™ or Google Analytics™. The manner in which the web analytic application 140 is implemented is generally known, and therefore will not be described at length herein. Suffice it to say that the web analytic application 140 is configured to track and store the browsing history data associated with the one or more of electronic devices (not shown) accessing the web server 134, within the web browsing log 142.

Examples of browsing history data that be stored within the web browsing log 142 includes, but not limited to:
  URLs of the accessed web resources hosted in the web server 134 (or any other web servers) services by the web analytic application 140;
  an access time of the web resources; and
  Monitored user behavior, such as, scrolling, clicking buttons, and the like.

The manner in which the browsing history data is collected by the web analytic application 140 is well known, and will not be described herein.

In some non-limiting embodiments, in addition to, or instead of, populating the web browsing log 142 with the browsing history data received from the web analytic application 140, it is contemplated that the browsing history data is received directly from the browser applications (not shown) of the one or more electronic devices.

In some non-limiting embodiments, populating the web browsing log 142 may be done using the search history log 130, with the search action data (such as the SERP transition) stored therein.

Content Selection Application

Figure 3:
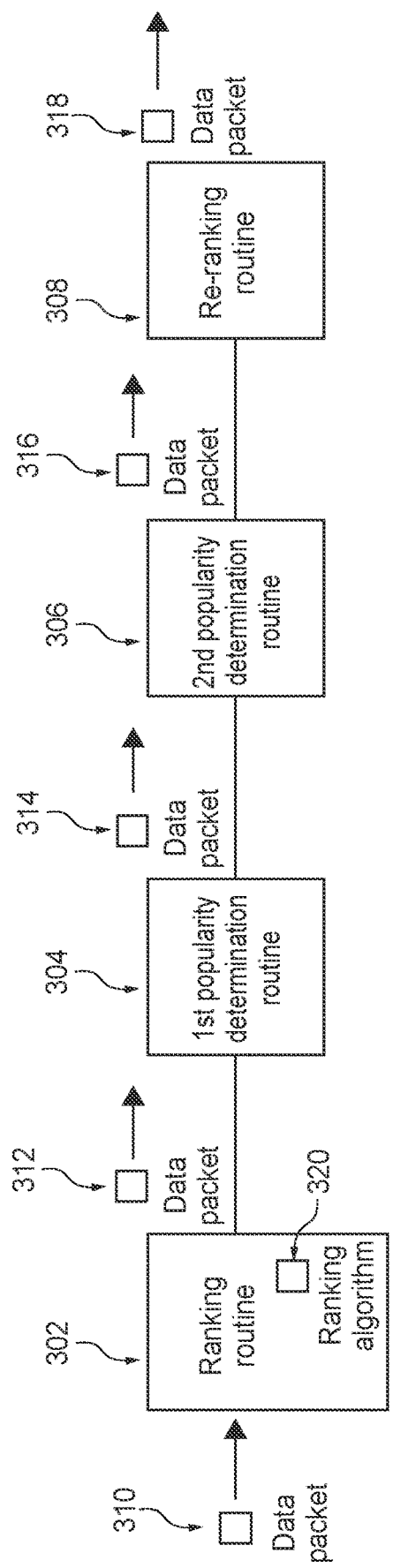
FIG. 3 depicts an example of a process of generating a digital content recommendation.

With reference to FIG. 3, there is provided a schematic illustration of the content selection application 118 being implemented in accordance with non-limiting embodiments of the present technology. The content selection application 118 executes (or otherwise has access to): a ranking routine 302, a first popularity determination routine 304, a second popularity determination routine 306, and a re-ranking routine 308.

In the context of the present specification, the term "routine" refers to a subset of the computer executable program instructions of the content selection application 118 that is executable by the server processor 116 to perform the functions explained below in association with the various routines (the ranking routine 302, the first popularity determination routine 304, the second popularity determination routine 306, and the re-ranking routine 308). For the avoidance of any doubt, it should be expressly understood that the ranking routine 302, the first popularity determination routine 304, the second popularity determination routine 306, and the re-ranking routine 308 are illustrated schematically herein as separate entities for ease of explanation of the processes executed by the content selection application 118. It is contemplated that some or all of the ranking routine 302, the first popularity determination routine 304, the second popularity determination routine 306 and the re-ranking routine 308 may be implemented as one or more combined routines.

For ease of understanding of the present technology, functionality of each one of the ranking routine 302, the first popularity determination routine 304, the second popularity determination routine 306, and the re-ranking routine 308, as well as data and/or information processed or stored therein are described below in sequence.

Ranking Routine

The ranking routine 302 is configured to receive a data packet 310 from the electronic device 104. The data packet 310 comprises a request by the electronic device 104 for the digital content recommendation 214. The manner in which the data packet 310 is transmitted from the electronic device 104 to the ranking routine 302 is not limited and may for example be transmitted in response to the user 102 accessing the recommendation application 106.

Figure 4:
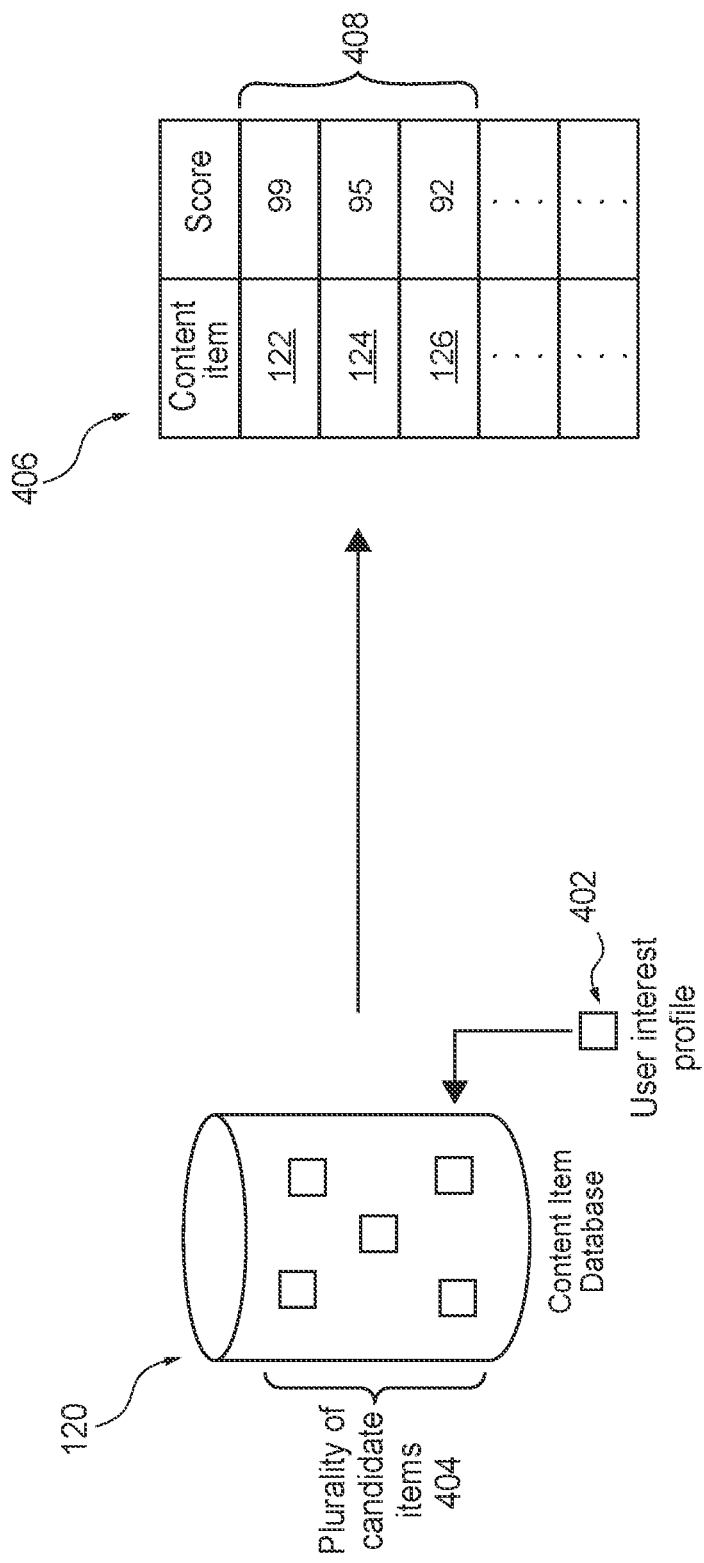
FIG. 4 depicts a schematic illustration of generating a ranked list, executed as part of the process of FIG. 3.

Turning the attention to FIG. 4, there is shown a schematic illustration of the actions executed by the ranking routine 302 in response to receiving the data packet 310.

Upon receiving the data packet 310, the ranking routine 302 is configured to determine a user interest profile 402 associated with the user 102, which may for example be a set of vectors representing the interests of the user 102.

The manner in which the user interest profile 402 is determined is not limited. Just as an example, the data packet 310 may comprise a unique ID associated with the electronic device 104 or with the user 102, which allows the recommendation server 112 to retrieve interactions of the user 102 associated with the unique ID, the interactions previously executed by the user 102 on the recommendation application 106 with regard to the previously presented digital content items.

Examples of interactions that may be used for determining the user interest profile 402 may include, for example, the user preferences previously inputted by the user 102, the search action data stored in the search history log 130, and system-specific browsing history data stored in the recommendation system browsing log 132, and the like.

It is further contemplated that the data packet 310 may comprise an indication of a location of the electronic device 104 (expressed as a geo position, an IP address, or the like), which may be used in determining the user interest profile 402.

Thus, based on this information, the user interest profile 402 is retrieved, and one or more candidate digital content items that may be of interest to the user 102 are selected. In some embodiments of the present technology, the user interest profile 402 can be generated "on the fly". An example of generating the user interest profile 402 is disclosed in U.S. Pat. No. 9,740,782 entitled METHOD FOR ESTIMATING USER INTERESTS issued on Aug. 22, 2017, the content of which is incorporated by reference herein in its entirety.

Having determined the user interest profile 402, the ranking routine 302 is configured to access the digital content item database 120, which comprises a plurality of candidate digital content items 404. The ranking routine 302 is configured to execute a ranking algorithm 320 (see FIG. 3) trained to rank the plurality of candidate digital content items 404 in order of relevancy to the user 102 based on the user interest profile 402.

The manner in which the ranking algorithm 320 ranks the plurality of candidate digital content items 404 is not limited and may be determined based on a set of digital content item features associated with each of the candidate digital content items as well as the user interest profile 402.

Needless to say, it is contemplated that the ranking algorithm 320 can rank the plurality of candidate digital content items 404 prior to receiving the data packet 310, based on the unique ID associated with the electronic device 104 or with the user 102.

In accordance with the present technology, the set of digital content item features may comprise digital content item-inherent characteristics that are associated with the digital content items. Just as an example, the content-inherent features may include the author of the digital content item, the length of the document measured in words or symbols, category/theme of the content, the number of previous display on the recommendation interface 108, the click through rate, and the like.

The manner in which the ranking score is implemented is not limited, and may for example be a predicted relevancy of the candidate digital content item to the user 102.

Having assigned a ranking score to each of the plurality of candidate digital content items 404, the ranking routine 302 is configured to generate a ranked list 406, which comprises each of the plurality of candidate digital content items ranked based on its respective ranking score.

In the illustration, the first digital content item 122 has been assigned a ranking score of 99 (on a scale of 1 to 100), the second digital content item 124 has been assigned a ranking score of 95, and the third digital content item 126 has been assigned a ranking score of 92, by the ranking algorithm 320. As such, the first digital content item 122 has been ranked the highest, followed by the second digital content item 124 and the third digital content item 126. Although only the first digital content item 122, the second digital content item 124 and the third digital content item 126 are shown as being assigned a respective ranking score, this is merely for ease of understanding, and it should be understood that more than three digital content items are assigned a respective ranking score.

First Popularity Determination Routine

Returning now to FIG. 3, once the ranked list 406 has been generated, the ranking routine 302 is configured to transmit a data packet 312 to the first popularity determination routine 304. The data packet 312 comprises the ranked list 406.

The first popularity determination routine 304 is configured to access the ranked list 406 and select a subset of candidate digital content items by applying a predefined inclusion parameter indicative of an acceptable number of digital content items to be included within the digital content recommendation 214.

The manner in which the predefined inclusion parameter is implemented is not limited and may for example include the top 3 higher ranked digital content items by the ranking routine 302. Needless to say, the predefined inclusion parameter may include more or fewer than 3 higher ranked digital content items.

The digital content items selected by the inclusion parameter together form a candidate digital content item recommendation set 408 (see FIG. 4). Needless to say, the application of the predefined inclusion parameter may be executed by the ranking routine 302 prior to transmitting the data packet 312, which would comprise the candidate digital content item recommendation set 408.

The first popularity determination routine 304 is further configured to determine if any candidate digital content item included within the candidate digital content item recommendation set 408 is a non-native digital content item.

As such, the first popularity determination routine 304 is configured to determine if any digital content item included within the candidate digital content item recommendation set 408 is associated with a tag (such as the first tag 125 and the second tag 127).

In the provided illustration, the second digital content item 124 is associated with the first tag 125, and the third digital content item 126 is associated with the second tag 127.

Having determined that the non-native digital content items included within the candidate digital content item recommendation set 408 (i.e. the second digital content item 124 and the third digital content item 126), the first popularity determination routine 304 is configured to determine a system specific popularity score to each of the second digital content item 124 and the third digital content item 126. For example, the system specific popularity score can represent a degree of popularity of non-native digital content item within the recommendation application 106.

Figure 5:
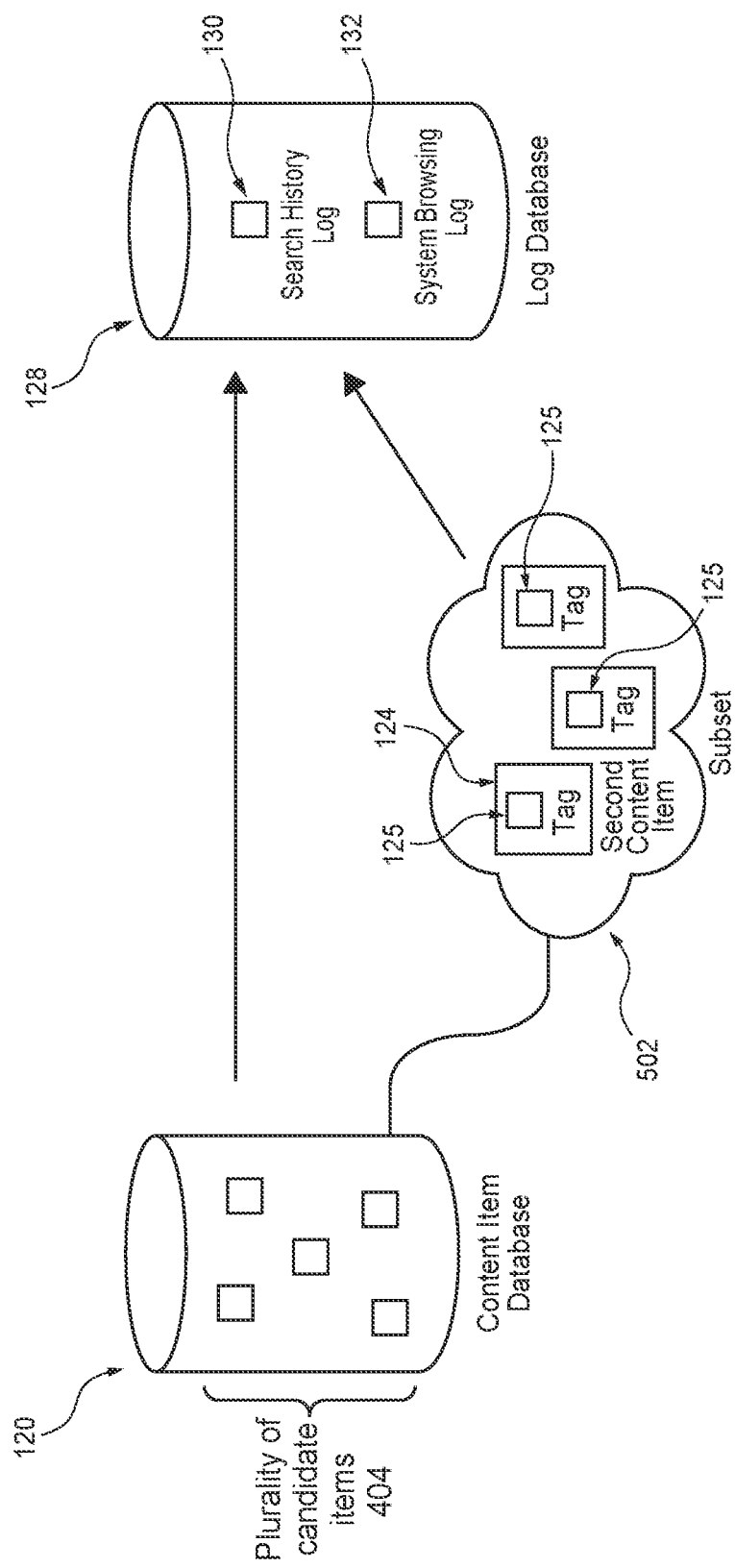
FIG. 5 depicts a schematic illustration of determining a system-specific popularity score, executed as part of the process of FIG. 3.

With reference to FIG. 5, the manner in which the system specific popularity score for the second digital content item 124 is determined will be explained. The manner in which the system specific popularity score for the third digital content item 126 is determined, can be executed in substantially similar manner.

Firstly, the first popularity determination routine 304 is configured to access the digital content item database 120 to identify a subset 502 of the plurality of candidate digital content items 404 that are also associated with the first tag 125. In other words, the first popularity determination routine 304 is configured to identify one or more candidate digital content items that originate from the same external source as the second digital content item 124. In the specific example being illustrated herein the first popularity determination routine 304 determines all digital content items that come from the same top-level domain.

The first popularity determination routine 304 is then configured to access the recommendation system browsing log 132 and the search history log 130 of the log database 128, to determine a number of interactions by the one or more of electronic devices over a period of time associated with the subset 502. For example, the first popularity determination routine 304 may be configured to determine the number of clicks associated with the subset 502 for the past 3 days. Needless to say, it is contemplated that the relevant period of time be more or less than 3 days.

The first popularity determination routine 304 is then configured to determine a total number of clicks by the one or more electronic devices with all the digital content items of the plurality of candidate digital content items 404, over the same period of time.

Thus, by determining the total number of user clicks associated with the plurality of candidate digital content items 404 and the number of user clicks associated with the subset 502, the first popularity determination routine 304 is configured to calculate the system specific popularity score as the share of traffic of the digital content items originating from the same external source as the second digital content item 124 within the recommendation application 106.

For example, assuming that 100 clicks are associated with the subset 502, and the total number of clicks associated with the plurality of candidate digital content items 404 is 10,000, the system specific popularity score corresponds to 0.01.

Needless to say, although in the above example, the system specific popularity score is implemented as a share of traffic (i.e. number of clicks) between the subset 502 and the plurality of candidate digital content items 404, it is not limited as such.

Indeed, recalling that the recommendation system browsing log 132 and the search history log 130 store other user interaction information (such as "liking" and "disliking", sharing the digital content item, and the like), it is contemplated that the system specific popularity score be determined by comparing (in addition to, or in lieu of the number of clicks) other user interaction information associated with the subset 502 and the plurality of candidate digital content items 404. As such, it is contemplated that each individual type of user interaction (such as clicks, "liking", "disliking"), be associated with a weight when using a plurality of user interaction to determine the system specific popularity score.

Second Popularity Determination Routine

Returning now to FIG. 3, once the respective system specific popularity score for the second digital content item 124 and the third digital content item 126 has been determined, the first popularity determination routine 304 is configured to transmit a data packet 314 to the second popularity determination routine 306. The data packet 314 comprises non-native digital content items included within the candidate digital content item recommendation set 408 (i.e. the second digital content item 124 and the third digital content item 126), as well as their respective system specific popularity score.

Upon receiving the second digital content item 124 and the third digital content item 126, the second popularity determination routine 306 is configured to determine a respective web popularity value for each of the second digital content item 124 and the third digital content item 126.

For example, the web popularity value represents a degree of popularity of the respective non-native digital content item within the communication network 110. In other words, the web popularity value represents a degree of popularity of the respective non-native digital content items outside the recommendation application 106.

Figure 6:
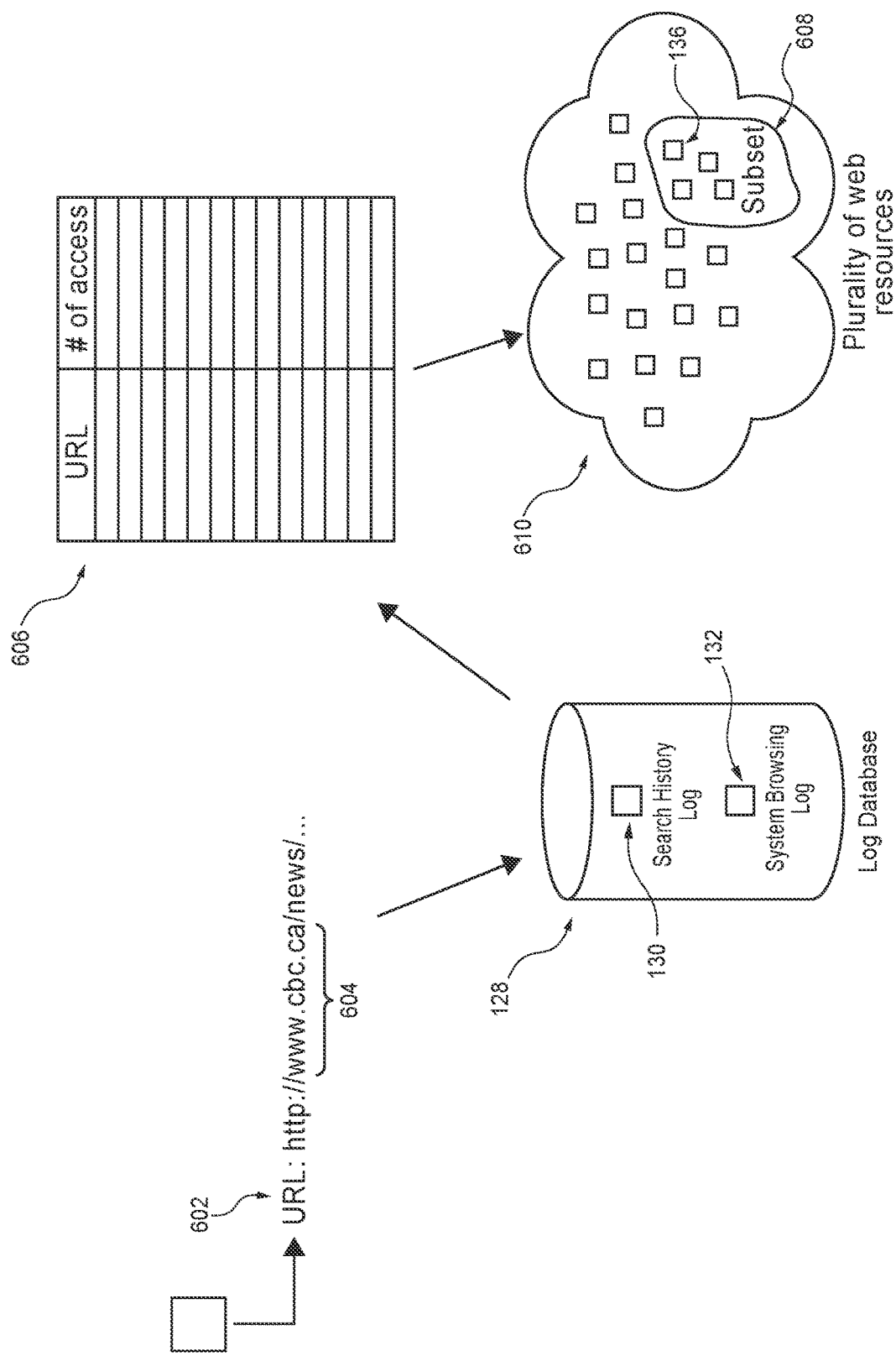
FIG. 6 depicts a schematic illustration of determining a web popularity value, executed as part of the process of FIG. 3.

With reference to FIG. 6, the manner in which the web popularity value for the second digital content item 124 is determined will be explained. The manner in which the web popularity value for the third digital content item 126 is determined, can be implemented in substantially similar manner The second popularity determination routine 306 is configured to retrieve an URL 602 associated with the second digital content item 124, and identify a domain name 604 associated with the second digital content item 124. In the illustrated example, the URL 602 is http://www.cbc.ca/news/ . . . , and thus the domain name 604 is www.cbc.ca. In other words, the domain name 604 can be the top level domain associated with the URL of the second digital content item 124.

Having identified the domain name 604, the second popularity determination routine 306 is configured to access the log database 128, and more particularly the web browsing log 142, and the search history log 130.

As mentioned briefly above, the web browsing log 142 stores the browsing history data received by the web analytic application 140 and/or the one or more electronic devices, including the electronic device 104. In addition, the search history log 130 stored information representative of past searches, and more particularly a list of URLs that have been accessed by the browser application(s) of the one or more electronic devices (not shown). Thus, based on the information contained within the web browsing log 142 and the search history log 130, the second popularity determination routine 306 is configured to generate a list 606 of web resources that have been previously accessed by the one or more electronic devices, within a predetermined period of time. The manner in which the predetermined period of time is implemented is not limited, and may correspond to 3 days. Needless to say, it is contemplated that the relevant period of time be more or less than 3 days.

As illustrated, the list 606 comprises a list of URLs that have been previously accessed by the electronic devices (including the electronic device 104) and the number of associated accesses within the predetermined period of time.

In some embodiments, the list 606 further comprises monitored user behaviors (such as scrolling, clicking links, and the like) associated with each URLs.

Now, the second popularity determination routine 306 is configured to access the list 606 and identify a plurality of web resources 610 that have been accessed by the one or more electronic devices.

The second popularity determination routine 306 is further configured to identify a subset 608 of the plurality of web resources 610. The subset 608 comprises one or more web resources having the domain name 604 (i.e. www.cbc.ca) within its respective URL or, in other words, originating from the domain associated with the domain name 604.

The second popularity determination routine 306 is then configured to (i) determine a total number of interactions by the plurality of electronic devices to the plurality of web resources 610, and (ii) the number of interactions by the plurality of electronic devices to the subset 608.

For example, the second determination routine 306 is configured to determine the number of accesses associated with the plurality of web resources 610 and the number of accesses by the plurality of electronic devices to the subset 608.

Thus, by determining the total number of accesses associated with the plurality of web resources 610 and the number of accesses associated with the subset, the second popularity determination routine 306 is configured to calculate the web popularity value as the share of traffic to the domain name 604 outside the recommendation application 106.

For example, assuming that 150 accesses are associated with the subset 608, and the total number of accesses with the plurality of web resources 610 is 100,000, the web popularity value corresponds to 0.0015.

Needless to say, although in the above example, the web popularity value is implemented as a share of traffic (i.e. number of accesses) between the subset 608 and the plurality of web resources 610, it is not limited as such.

Indeed, recalling that the web browsing log 142 stores monitored user behaviors (such as scrolling, clicking links, and the like), it is contemplated that the web popularity value be determined by comparing (in addition to, or in lieu of the number of accesses) other types of interactions, such as monitored user behaviors associated with the subset 608 and the plurality of web resources 610. As such, it is contemplated that each individual type of user interaction (such as clicking. scrolling, and the like), be associated with a weight when using a plurality of user interaction to determine the web popularity value.

Re-Ranking Routine

Returning now to FIG. 3, once the web popularity value for the second digital content item 124 and the third digital content item 126 has been determined, the second popularity determination routine 306 is configured to transmit a data packet 316 to the re-ranking routine 308. The data packet 316 comprises (i) the system specific popularity scores (determined by the first popularity determination routine 304) and (ii) the web popularity values, of the second digital content item 124 and the third digital content item 126.

As briefly discussed above, in developing the current technology, developers observed that unlike native digital content items (such as the first digital content item 122) that originates from a trusted source (i.e. a native content channel) and that can be managed by known approaches, non-native digital content items (such as the second digital content item 124 and the third digital content item 126) may in some instances be geared to receive more clicks, by for example providing scandalous titles to draw user's interest (commonly known as "clickbait"). Generally speaking, these types of digital content items not only negatively affect the user experience but also makes it difficult for the ranking routine 302 to properly assess its relevancy to the user 102, especially when the ranking score is determined (by the ranking algorithm 320), based on, inter alia, the click through rate of the given non-native digital content item.

Developers developed the non-limiting embodiments of the present technology based on the premise that by analyzing the system specific popularity score and the web popularity value of a given non-native digital content item, it is possible to predict the likelihood that the given non-native digital content item has been potentially mis-ranked by the ranking algorithm as relevant, where in reality it is irrelevant (i.e. is a clickbait) relative to the user 102, and consequently remove the non-native digital content item from the candidate digital content item recommendation set 408.

As such, the non-limiting embodiments of the present technology have been developed on the premise that if the popularity of the given non-native digital content item on the web is similar to the popularity within the recommendation application 106 (i.e. if the two are "aligned"), the given non-native digital content item is likely not clickbait content, and the candidate digital content item recommendation set 408 is not adjusted.

If there is a misalignment between the system specific popularity score and the web popularity value, meaning that the popularity on the web is lower than the popularity within the recommendation application 106, the given non-native digital content item is considered to be a clickbait, and the candidate digital content item recommendation set 408 is readjusted. However, if the popularity of the given non-native digital content item on the web is higher than the popularity within the recommendation application 106, the given non-native digital content item is considered to be not clickbait content, and the candidate digital content item recommendation set 408 is not adjusted.

Now, in order to adjust the candidate digital content item recommendation set 408, a popularity adjustment score is calculated (described below) by the re-ranking routine 308 based on the system specific popularity score and the web popularity value associated with a given non-native digital content item (i.e. the second digital content item 124 and the third digital content item 126).

Figure 7:
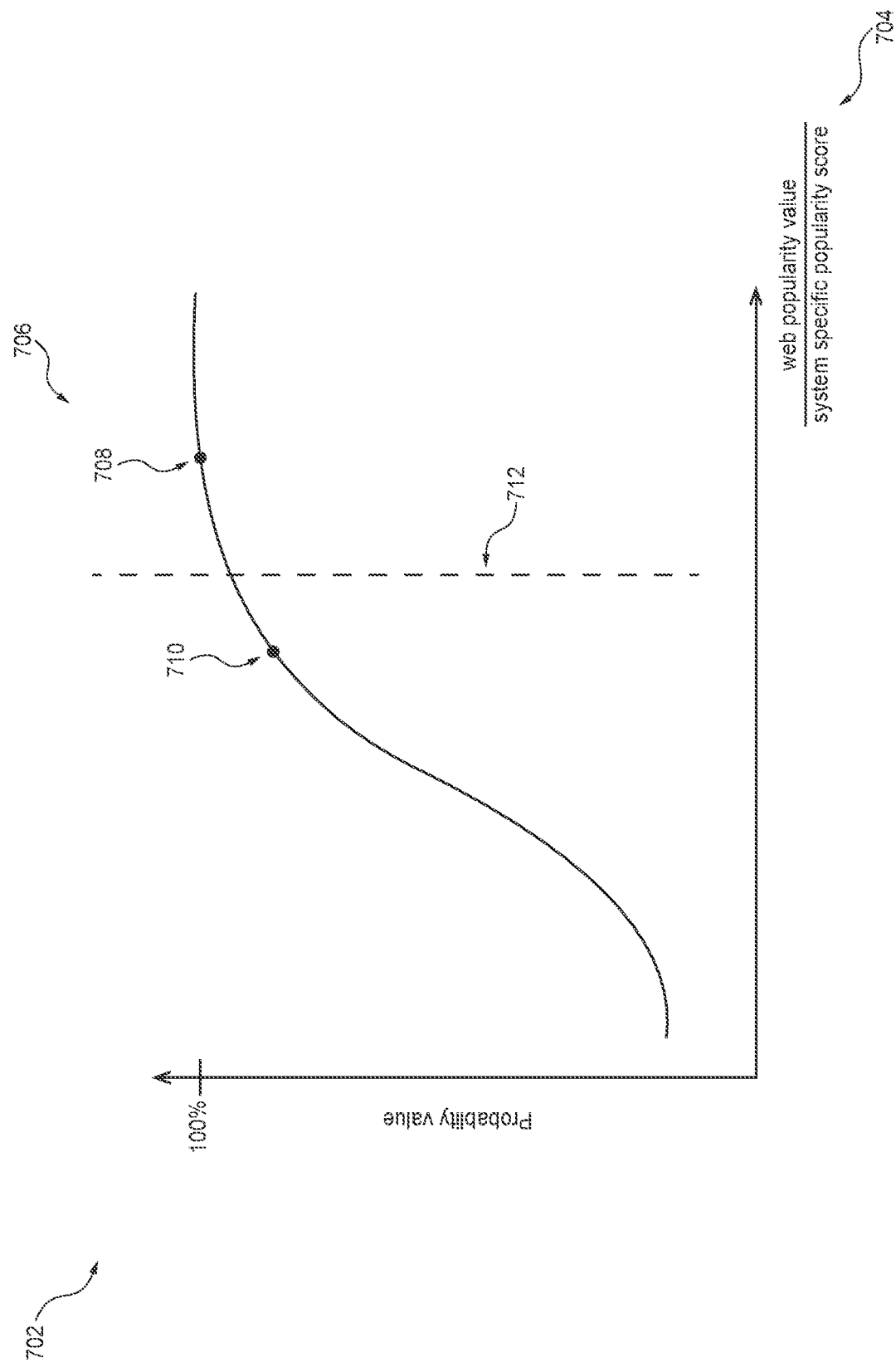
FIG. 7 depicts a graph for determining a probability value of inclusion of a content item for display, the probability value determined as part of the process of FIG. 3.

FIG. 7 illustrates a sigmoid graph 706 illustrating a relationship between a ratio 704 of the web popularity value and the system specific popularity score of a given non-native digital content item (in the X axis) and a probability value 702 indicative of a likelihood that the system specific popularity score of a given non-native digital content item is aligned with the associated web popularity value (in the Y axis).

The graph 706 is generated using the formula:

$$S(x) = base + \frac{1.0 - base}{0.5} \times \left[ \frac{1}{1 + e^{-power \times ratio}} - 0.5 \right] \quad \text{Formula (1)}$$

where S(x) is the probability value 702, base is a lowest possible probability value, power is a steepness of the curve, and the ratio is the ratio of the web popularity values and system specific popularity scores.

Now, the re-ranking routine 308 is configured to calculate, using the Formula (1) the respective probability values of the second digital content item 124 and the third digital content item 126 based on their respective web popularity values and system specific popularity scores.

In the illustrated example, the probability value associated with the second digital content item 124 is schematically shown as a first point 708. Moreover, the probability value associated with the third digital content item 126 is schematically shown as a second point 710.

The re-ranking routine 308 is further configured to determine if the probability values (i.e. illustrated as the first point 708 and the second point 710) are below or above a threshold value 712. The threshold value 712 is indicative of whether or not the given non-native digital content item is likely to be clickbait content or not. In other words, if the given non-native digital content item is mapped above the threshold value 712, its associated web popularity value and system specific popularity score are aligned, and vice-versa. The manner in which the threshold value 712 is determined is not limited, and may be determined empirically.

The re-ranking routine 308 is further configured to determine the popularity adjustment score to a given non-native digital content item based on whether its probability value is above or below the threshold value 712. The manner in which the popularity adjustment score is implemented is not limited, and may for example be a binary score.

Now, with reference to the graph 706, the first point 708 (associated with the second digital content item 124) is above the threshold value 712, whereas the second point 710 (associated with the third digital content item 126) is below the threshold value 712. Accordingly, the re-ranking routine 308 is configured to assign a binary score of 1 to the second digital content item 124 as the popularity adjustment score, and a binary score of 0 to the third digital content item 126 as the popularity adjustment score.

Needless to say, although the popularity adjustment score is described herein above as a binary score, it is not limited as such, and may for example be implemented as a scaled score (for example, from 0 to 100). For example, the re-ranking routine 308 may be configured to assign a first scaled score of 100 to the second digital content item 124 as the popularity adjustment score, since the first point 708 is above the threshold value 712. Alternatively, a second scaled score may be assigned to the third digital content item 126 as the popularity adjustment score. The second scaled score may be empirically determined based on the distance of the second point 710 to the threshold value 712.

Needless to say, although a sigmoid function is used to determine the popularity adjustment score, it is not limited, and other functions, such as a linear function may be used to determine the popularity adjustment score.

Figure 8:
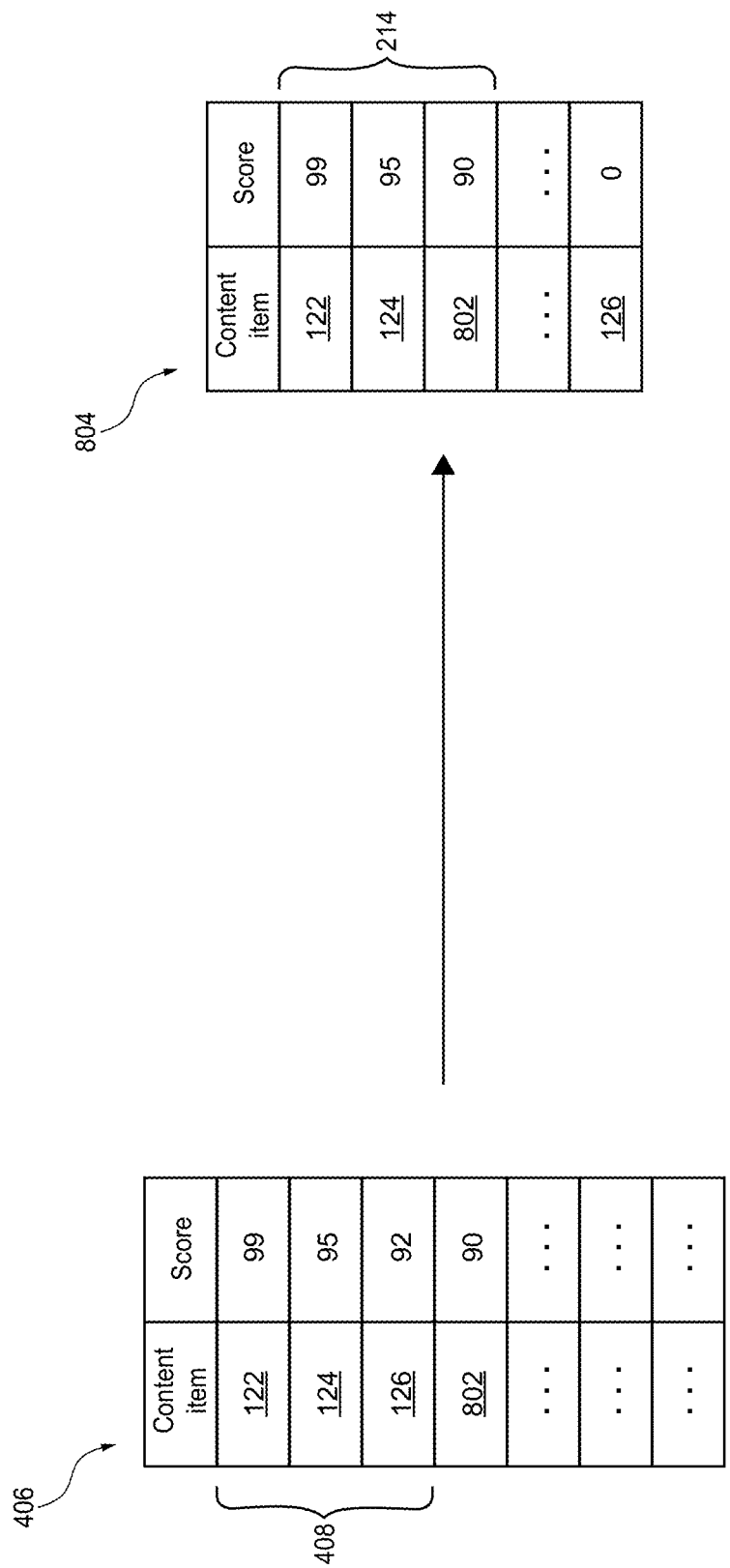
FIG. 8 depicts a schematic illustration of generating a re-adjusted ranked list, executed as part of the process of FIG. 3.

With reference to FIG. 8, the manner in which the digital content recommendation 214 is generated will be explained.

The re-ranking routine 308 is configured to access the candidate digital content item recommendation set 408. As described above, the candidate digital content item recommendation set 408 comprises the 3 highest ranked digital content items within the ranked list 406 (as determined by the ranking routine 302). There is further provided a fourth digital content item 802, which is associated with a fourth highest ranking score, within the ranked list 406 (but not within the candidate digital content item recommendation set 408).

The re-ranking routine 308 is configured to adjust the ranking scores associated with the non-native digital content items (i.e. the second digital content item 124 and the third digital content item 126) included within the candidate digital content item recommendation set 408, based on the previously determined popularity adjustment scores.

The manner in which the ranking scores of the non-native digital content items is adjusted is not limited. For example, recalling that the popularity adjustment score is implemented as a binary value, the re-ranking routine 308 may multiply the popularity adjustment scores to the associated ranking scores.

Thus, if the popularity adjustment score of the second digital content item 124 is 1, the associated ranking score remains the same. On the other hand, if the popularity adjustment score of the third digital content item 126 is 0, the associated ranking score is adjusted to 0.

By adjusting the ranking scores of the non-native digital content items included within the candidate digital content item recommendation set 408, the re-ranking routine 308 generates a re-adjusted ranked list 804.

It is noted that the third digital content item 126 is now at the bottom of the re-adjusted ranked list 804, and the fourth candidate item 802 is now the third highest ranked digital content item.

Similar to the first popularity determination routine 304, the re-ranking routine 308 is configured to apply the pre-defined inclusion parameter to select the top 3 highest ranked digital content items within the re-adjusted ranked list 804 (comprising the first digital content item 122, the second digital content item 124 and the fourth digital content item 802) as the digital content recommendation 214.

Needless to say, the re-ranking routine 308 may be configured to determine if the fourth digital content item 802 is a non-native digital content item, and in the affirmative, determine its popularity adjustment score to adjust its ranking score.

Having generated the digital content recommendation 214, the re-ranking routine 308 is configured to transmit a data packet 318 to the electronic device 104. The data packet 318 comprises the digital content recommendation 214 for display by the electronic device 104.

The various non-limiting embodiments of the present technology may allow the generating of digital content recommendation 214 that include potentially more relevant digital content items to the user for a better user satisfaction.

Figure 9:
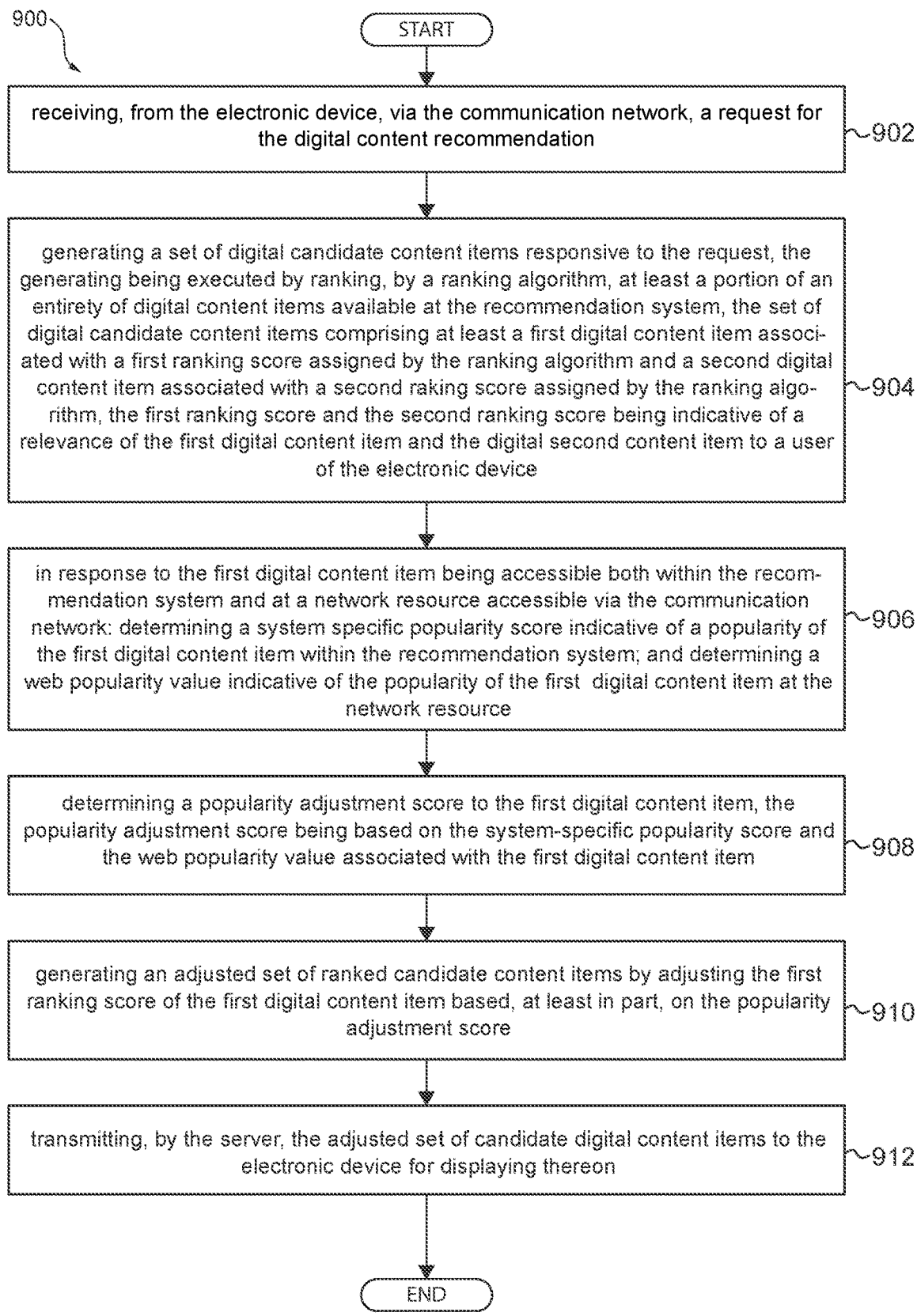
FIG. 9 depicts a block diagram of a flow chart of a method for generating a digital content recommendation.

Given the architecture and examples provided hereinabove, it is possible to execute a computer-implemented method for generating the digital content recommendation 214. With reference to FIG. 9, there is depicted a flow chart of a method 900 for generating the digital content recommendation 214, the method 900 being executable in accordance with non-limiting embodiments of the present technology. The method 900 can be executed by the recommendation server 112.

Step 902: receiving, from the electronic device, via the communication network, a request for the digital content recommendation The method 900 starts at step 902, where the ranking routine 302 acquires the data packet 310 from the electronic device 104, which comprises a request for digital content recommendation 214. The manner in which the electronic device 104 transmits the data packet 310 is not limited, and may for example be in response to the user 102 accessing the recommendation application 106.

Step 904: generating a set of digital candidate content items responsive to the request, the generating being executed by ranking, by a ranking algorithm, at least a portion of an entirety of digital content items available at the recommendation system, the set of digital candidate content items comprising at least a first digital content item associated with a first ranking score assigned by the ranking algorithm and a second digital content item associated with a second raking score assigned by the ranking algorithm, the first ranking score and the second ranking score being indicative of a relevance of the first digital content item and the digital second content item to a user of the electronic device At step 904, the ranking routine 302 accesses the digital content item database 120. The ranking routine 302 is configured to execute the ranking algorithm 320 trained to rank the plurality of candidate digital content items 404 based on the user interest profile 402 and the set of digital content item features associated with each of the candidate, to generate the ranked list 406. Needless to say, the ranking algorithm 320 may only rank a portion of the plurality of candidate digital content items 404.

In generating the ranked list 406, the ranking algorithm 320 assigns a ranking score to each of the digital content items.

The ranked list 406 comprises the second digital content item 124 and the third digital content item 126 which are associated with a respective ranking score (see FIG. 4).

Step 906: in response to the first digital content item being accessible both within the recommendation system and at a network resource accessible via the communication network: determining a system specific popularity score indicative of a popularity of the first digital content item within the recommendation system; and determining a web popularity value indicative of the popularity of the first digital content item at the network resource At step 906, the ranking routine 302 transmits the data packet 312 to the first popularity determination routine 304, which comprises the ranked list 406.

In some embodiments, the first popularity determination routine 304 is configured to apply an inclusion parameter to select the top n-th highest ranked digital content items within the ranked list 406.

Recalling that the second digital content item 124 is a non-native digital content item and as such is associated with the first tag 125, the first popularity determination routine 304 is configured to identify within the plurality of candidate digital content items 404, the subset 502 of digital content items that are also associated with the first tag 125.

The first popularity determination routine 304 is further configured to calculate the system specific popularity score of the second digital content item 124 based on (i) the number of clicks (or other interactions) associated with the subset 502 and (ii) the total number of clicks (or other interactions) associated with the plurality of candidate digital content items 404, over a period of time.

Having determined the system specific popularity score, the first popularity determination routine 304 is configured to transmit the data packet 314 to the second popularity determination routine 306, which comprises, inter alia, the second digital content item 124.

The second popularity determination routine 306 is configured to analyze the URL 602 (see FIG. 6) associated with the second digital content item 124, and retrieve the domain name 604.

Having identified the domain name 604, the second popularity determination routine 306 is configured to access the log database 128, and more particularly the web browsing log 142, and the search history log 130.

As mentioned briefly above, the web browsing log 142 is populated with browsing history data received by the web analytic application 140 and/or the one or more electronic devices. In addition, the search history log 130 comprises search action data which comprises a list of URLs that have been accessed by the browser application of the one or more electronic devices (not shown). Thus, based on the information contained within the web browsing log 142 and the search history log 130, the second popularity determination routine 306 is configured to generate the list 606 comprising the web resources that have been previously accessed by the one or more electronic devices.

The second popularity determination routine 306 is further configured to identify a subset 608 of the plurality of web resources 610. The subset 608 comprises one or more web resources having the domain name 604 (i.e www.cbc.ca) within its respective URL.

The second popularity determination routine 306 is configured to calculate the web popularity value of the second digital content item 124 based on (i) the number of accesses (or other interactions) associated with the subset 608, and (ii) the total number of accesses (or other interactions) associated with the plurality of web resources 610, over the period of time.

Step 908: determining a popularity adjustment score to the first digital content item, the popularity adjustment score being based on the system-specific popularity score and the web popularity value associated with the first digital content item At step 908, the second popularity determination routine 306 is configured to transmit the data packet 316 to the re-ranking routine 308, which comprises the system specific popularity score and the web popularity value of the second digital content item 124.

The re-ranking routine 308 is configured to map the ratio of the system specific popularity score and the web popularity value of the second digital content item 124 into the graph 706, to determine the probability value 702 associated with the second digital content item 124.

In response to the probability value 702 being above the predefined threshold value 712, the second digital content item 124 is assigned by the re-ranking routine 308 a first popularity adjustment score (such as 1). In response to the probability value 702 being below the predefined threshold value 712, the second digital content item 124 is assigned by the re-ranking routine 308 a second popularity adjustment score (such as 0).

Step 910: generating an adjusted set of ranked candidate content items by adjusting the first ranking score of the first digital content item based, at least in part, on the popularity adjustment score At step 910, the re-ranking routine 308 is configured to access the ranked list 406, and adjust the ranking score of the second digital content item 124.

Recalling that the popularity adjustment score is implemented as a binary score, the re-ranking routine 308 is configured to multiply the previously determined popularity adjustment score of the second digital content item 124 to the ranking score of the second digital content item 124, to obtain a re-adjusted ranking score of the second digital content item 124. In other words, the re-adjusted ranking score of the second digital content item may equal to its original ranking score, or to 0, depending on the previously assigned popularity adjustment score.

Based on the re-adjusted ranking score of the second digital content item 124, the re-ranking routine 308 is configured to generate the re-adjusted ranked list 804.

Step 912: transmitting, by the server, the adjusted set of candidate digital content items to the electronic device for displaying thereon At step 912, the re-ranking routine 308 is configured to apply to the re-adjusted ranked list 804 a predefined inclusion parameter indicative of an acceptable number of higher-ranked digital content items to be included within the digital content recommendation 214 for display.

The recommendation server 112 is configured to transmit the data packet 318 to the electronic device 104. The data packet 318 comprises the digital content recommendation 214.

It should be apparent to those skilled in the art that at least some embodiments of the present technology aim to expand a range of technical solutions for addressing a particular technical problem encountered by the conventional digital content item recommendation systems, namely selecting and providing for display digital content items that are relevant to the users.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer implemented method for generating a digital content recommendation, the digital content recommendation for displaying on an electronic device associated with a user, the method being executed by a server of a recommendation system connectable to the electronic device via a communication network, the recommendation system executing a ranking algorithm, the method comprising:

receiving, from the electronic device, via the communication network, a request for the digital content recommendation;

generating a set of digital candidate content items responsive to the request, the generating being executed by ranking, by a ranking algorithm, at least a portion of an entirety of digital content items available at the recommendation system, the set of digital candidate content items comprising at least a first digital content item associated with a first ranking score assigned by the ranking algorithm and a second digital content item associated with a second raking score assigned by the ranking algorithm, the first ranking score and the second ranking score being indicative of a relevance of the first digital content item and the digital second content item to a user of the electronic device;

in response to the first digital content item being accessible both within the recommendation system and at a network resource accessible via the communication network:

determining a system specific popularity score indicative of a popularity of the first digital content item within the recommendation system;

determining a web popularity value indicative of the popularity of the first digital content item at the network resource;

determining a popularity adjustment score to the first digital content item, the popularity adjustment score being determined by:

determining a ratio of the web popularity value to the system specific popularity score;

applying the ratio to a sigmoid function to obtain a probability value indicative of a likelihood that the first digital content item is a clickbait;

in response to determining that the probability value is above a threshold, assigning a first score as the popularity adjustment score, the first score being indicative that the first digital content item is not a clickbait;

in response to determining that the probability value is below the threshold, assigning a second score as the popularity adjustment score the second score being indicative that the first digital content item is a clickbait;

generating an adjusted set of ranked candidate content items by adjusting the first ranking score of the first digital content item based, at least in part, on the popularity adjustment score; and transmitting, by the server, the adjusted set of candidate digital content items to the electronic device for displaying thereon.

2. The method of claim 1, wherein the first digital content item originates from a first source and the second digital content item originates from a second source.

3. The method of claim 2, wherein the recommendation system comprises a plurality of digital content items, and wherein the determining the system specific popularity score comprises:

determining, for the plurality of digital content items, a total number of clicks executed by a plurality of electronic devices over a period of time;

identifying a subset of the plurality of digital content items originating from the first source;

determining a number of clicks associated with the subset of the plurality of digital content items over the period of time;

dividing the number of clicks by the total number of clicks.

4. The method of claim 3, wherein the communication network is coupled to a plurality of network resources accessible by the plurality of electronic devices, and wherein the determining the web popularity value comprises:

determining, for the plurality of network resources, a total number of accesses by the plurality of electronic device over the period of time;

retrieving a domain name associated with a uniform resource locator (URL) of the first digital content item;

identifying a subset of the plurality of network resources having a URL comprising the domain name;

determining a number of accesses by the plurality of electronic device to the subset of the plurality of network resources over the period of time;

dividing the number of accesses by the total number of accesses.

5. The method of claim 4, wherein determining the total number of accesses and the number of accesses comprises analyzing at least one of:

search logs associated with the plurality of electronic devices;

browser logs associated with the plurality of electronic devices; and web analytic data collected by a web analytic application coupled to the server.

6. The method of claim 2, wherein the first digital content item being a non-native content item non-native to the recommendation system; and the second digital content item being a native digital content item native to the recommendation system, the second source being a content channel that is native to the recommendation system.

7. The method of claim 1, wherein generating the adjusted set of ranked candidate digital content items comprises:

calculating an adjusted first ranking score associated with the first digital content item based at least on the popularity adjustment score; and re-ranking, the first digital content item based on the adjusted first ranking score.

8. The method of claim 7, wherein the adjusted first ranking score is lower than the first ranking score.

9. The method of claim 1, wherein the adjusted set of candidate digital content items excludes the first digital content item.

10. The method of claim 1, wherein the first digital content item and the second digital content item is at least one of:

an image;

a text; and a video.

11. A system for generating a digital content recommendation, the digital content recommendation for displaying on an electronic device associated with a user, the system comprising a server of a recommendation system connectable to the electronic device via a communication network, the recommendation system executing a ranking algorithm, the server comprising a processor configured to:

receive, from the electronic device, via the communication network, a request for the digital content recommendation;

generate a set of digital candidate content items responsive to the request, the generating being executed by ranking, by a ranking algorithm, at least a portion of an entirety of digital content items available at the recommendation system, the set of digital candidate content items comprising at least a first digital content item associated with a first ranking score assigned by the ranking algorithm and a second digital content item associated with a second raking score assigned by the ranking algorithm, the first ranking score and the second ranking score being indicative of a relevance of the first digital content item and the digital second content item to a user of the electronic device;

in response to the first digital content item being accessible both within the recommendation system and at a network resource accessible via the communication network:

determine a system specific popularity score indicative of a popularity of the first digital content item within the recommendation system;

determine a web popularity value indicative of the popularity of the first digital content item at the network resource;

assign a popularity adjustment score to the first digital content item, to assign the popularity adjustment score, the processor is configured to determine a ratio of the web popularity value to the system specific popularity score;

apply the ratio to a sigmoid function to obtain a probability value indicative of a likelihood that the first digital content item is a clickbait;

in response to determining that the probability value is above a threshold, assign a first score as the popularity adjustment score, the first score being indicative that the first digital content item is not a clickbait;

in response to determining that the probability value is below the threshold, assign a second score as the popularity adjustment score the second score being indicative that the first digital content item is a clickbait:

generate an adjusted set of ranked candidate content items by adjusting the first ranking score of the first digital content item based, at least in part, on the popularity adjustment score; and transmit, by the server, the adjusted set of candidate digital content items to the electronic device for displaying thereon.

12. The system of claim 11, wherein the adjusted set of candidate digital content items excludes the first digital content item.

13. The system of claim 11, wherein the first digital content item originates from a first source and the second digital content item originates from a second source.

14. The system of claim 13, wherein the recommendation system comprises a plurality of digital content items, and wherein to determine the system specific popularity score, the processor is configured to:

determine, for the plurality of digital content items, a total number of clicks executed by a plurality of electronic devices over a period of time;

identify a subset of the plurality of digital content items originating from the first source;

determine a number of clicks associated with the subset of the plurality of digital content items over the period of time;

divide the number of clicks by the total number of clicks.

15. The system of claim 14, wherein the communication network is coupled to a plurality of network resources accessible by the plurality of electronic devices, and wherein to determine the web popularity value, the processor is configured to:

determine, for the plurality of network resources, a total number of accesses by the plurality of electronic device over the period of time;

retrieve a domain name associated with a uniform resource locator (URL) of the first digital content item;

identify a subset of the plurality of network resources having a URL comprising the domain name;

determine a number of accesses by the plurality of electronic device to the subset of the plurality of network resources over the period of time;

divide the number of accesses by the total number of accesses.

16. The system of claim 15, wherein to determine the total number of accesses and the number of accesses, the processor is configured to analyze at least one of:

search logs associated with the plurality of electronic devices;

browser logs associated with the plurality of electronic devices; and web analytic data collected by a web analytic application coupled to the server.

17. The system of claim 13, wherein the first digital content item being a non-native content item non-native to the recommendation system; and the second digital content item being a native digital content item native to the recommendation system, the second source being a content channel that is native to the recommendation system.

18. The system of claim 11, wherein to generate the adjusted set of ranked candidate digital content items, the processor is configured to:

calculate an adjusted first ranking score associated with the first digital content item based at least on the popularity adjustment score; and re-rank, the first digital content item based on the adjusted first ranking score.

19. The system of claim 18, wherein the adjusted first ranking score is lower than the first ranking score.

* * * * *